US011073362B1

(12) United States Patent
Barnawi

(10) Patent No.: US 11,073,362 B1
(45) Date of Patent: Jul. 27, 2021

(54) DISTRIBUTED AIRBORNE ACOUSTIC ANTI DRONE SYSTEM (DAAADS)

(71) Applicant: King Abdulaziz University, Jeddah (SA)

(72) Inventor: Ahmed Barnawi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/001,071

(22) Filed: Aug. 24, 2020

(51) Int. Cl.
*F41H 11/02* (2006.01)
*G06N 20/00* (2019.01)
*B64C 39/02* (2006.01)

(52) U.S. Cl.
CPC ............ *F41H 11/02* (2013.01); *B64C 39/024* (2013.01); *G06N 20/00* (2019.01); *B64C 2201/12* (2013.01)

(58) Field of Classification Search
CPC ....................................................... F41H 11/02
See application file for complete search history.

(56) References Cited

U.S. PATENT DOCUMENTS

| | | | | |
|---|---|---|---|---|
| 6,747,584 | B2 * | 6/2004 | Havelock | G10K 11/346 341/143 |
| 8,031,556 | B2 * | 10/2011 | Magane | G01S 15/931 367/99 |
| 9,103,628 | B1 * | 8/2015 | Moraites | G01S 3/784 |
| 9,524,648 | B1 * | 12/2016 | Gopalakrishnan | H04K 3/224 |
| 10,032,464 | B2 | 7/2018 | Franklin et al. | |
| 10,137,982 | B1 * | 11/2018 | Dormiani | B64C 27/39 |
| 10,854,019 | B1 * | 12/2020 | Barnes | G07B 15/063 |
| 2005/0271221 | A1 | 12/2005 | Cerwin | |
| 2006/0110008 | A1 * | 5/2006 | Vertegaal | G06T 7/251 382/103 |

(Continued)

FOREIGN PATENT DOCUMENTS

CN 205482613 U * 8/2016
GB 253 60 43 A * 5/2015
RU 2 604 914 C2 12/2016

OTHER PUBLICATIONS

NPL, Kardasz, Drones and Possibilities of Their Using, Jan. 2016, Journal of Civil & Environmental Engineering 6(3), DOI: 10.4172/2165-784X.1000233 (https://www.researchgate.net/publication/305273853_Drones_and_Possibilities_of_Their_Using) (hereinafter "Kardasz").*

(Continued)

*Primary Examiner* — Jean Paul Cass
(74) *Attorney, Agent, or Firm* — Oblon, McClelland, Maier & Neustadt, L.L.P.

(57) ABSTRACT

A system, method, and non-transitory computer readable medium that detects trajectories of unmanned aerial vehicles (UAV) approaching a protected site is described. Airborne defense agents (ADAs) located at a fixed radius from the protected and equidistant from one another detect acoustic signals emitted by an approaching UAV. Circuitry included in each ADA use the detected acoustic signals to determine a direction and a distance of each UAV. A base station having a control center (BS-CC) located in the protected site communicates with the ADAs to aggregate direction and distance data from the ADAs. Using the aggregated direction and distance data, the BS-CC predicts routes towards the protected site of the approaching UAV and alerts the protected site of the predicted route of the approaching UAV.

11 Claims, 15 Drawing Sheets

(56) References Cited

U.S. PATENT DOCUMENTS

| | | | |
|---|---|---|---|
| 2006/0262646 A1 | 11/2006 | Horak et al. | |
| 2008/0284848 A1* | 11/2008 | Martin | F41H 11/02 348/143 |
| 2013/0113625 A1* | 5/2013 | Libby | G08B 13/2491 340/541 |
| 2015/0350914 A1* | 12/2015 | Baxley | H04L 63/02 726/11 |
| 2016/0232777 A1* | 8/2016 | Jedwab | G08B 13/19602 |
| 2016/0299233 A1* | 10/2016 | Levien | G08G 5/0008 |
| 2017/0039413 A1 | 2/2017 | Nadler | |
| 2017/0364828 A1* | 12/2017 | Bennett | A01D 34/64 |
| 2018/0204331 A1* | 7/2018 | Omari | G01S 13/878 |
| 2019/0166420 A1* | 5/2019 | Paulsen | G08G 5/0052 |
| 2019/0384303 A1* | 12/2019 | Muller | G06K 9/00791 |
| 2020/0072582 A1* | 3/2020 | Factor | F41H 13/0062 |
| 2020/0183429 A1* | 6/2020 | Ottenheimer | F41H 11/02 |
| 2020/0241575 A1* | 7/2020 | Meisenholder | G05D 1/12 |
| 2020/0317337 A1* | 10/2020 | Chalker | B64C 39/024 |
| 2020/0389624 A1* | 12/2020 | Oberholzer | G01S 13/887 |

OTHER PUBLICATIONS

NPL, Sherman, Robert, AN/SSQ-53 Directional Frequency Analysis and Recording Sonobuoy, Military Analysis Network, (https://fas.org/man/dod-101/sys/ship/weaps/an-ssq-53.htm).*

Sherman, attachment as source 1. Navy Training System Plan for the Navy Consolidated Sonobuoys N88-NTSP-A-50-8910B/A Sep. 1998.*

Yue, et al.; Software Defined Radio and Wireless Acoustic Networking for Amateur Drone Surveillance; IEE Communications Magazine, vol. 56, Issue 4; Apr. 13, 2018; Abstract Only; 2 Pages.

Chang, et al.; A Surveillance System for Drone Localization and Tracking Using Acoustic Arrays; ResearchGate Conference Papers; Jul. 2018; 6 Pages.

Skylock; Comprehensive Anti Drone Systems; https://www.skylock1.com; Jul. 31, 2020; 7 Pages.

Dedrone; DroneDNA—Dedrone; https://www.dedrone.com/products/dronedna; Jul. 31, 2020; 5 Pages.

Vision System; Phantom 4—DJI's smartest flying camera ever; https://www.dji.com/phantom-4; Jul. 31, 2020; 13 Pages.

* cited by examiner

DISTRIBUTED AIRBORNE ACOUSTIC ANTI DRONE SYSTEM (DAAADS)

BACKGROUND

Technical Field

The present disclosure is directed to systems and methods for detecting unmanned aerial vehicles.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In September 2019, Unmanned Aerial Vehicles (UAVs), also known as "drones", were used to carry out a terrorist attack on the Saudi Aramco oil field, the largest oil field in the world at the time. As the cost of commercially available drones continues to decrease and as their popularity continues to increase, high priority has been given to detecting potentially unauthorized UAVs designed to conduct malicious/hostile activities particularly those in the midst of committing such acts. This is especially true for law enforcement agencies. As a UAV can go almost undetected using conventional optical or electromagnetic sensing techniques, there is great need for innovation in proactively detecting hostile UAVs and intercepting the trajectory of an attacking UAV in a cost-effective manner that reduces collateral damage to the surrounding environment.

Some systems currently available for drone detection utilize a collection of sensors, such as radio frequency (RF) sensors and/or ultrasonic sensors, and closed-circuit television (CCTV) cameras to detect drone activity. DRONEDNA, offered by Dedrone of Dallas, Tex., is one specific example of such a system. However, DRONEDNA and other similar systems suffer from poor night vision, a limited area of coverage, and slow response time. Other systems for detecting UAVs currently available, such as SKYLOCK, offered by the Avnon Group of Petah Tikva, Israel, provide a multi-layered platform of modular systems for the detection, verification, and neutralization of unauthorized UAVs through a combination of passive and active systems including RF and/or infrared (IR) radar systems. However, SKYLOCK and similar systems face limitations based on the signals being emitted by a suspected unauthorized UAV, the materials of which the UAV is made, and the system being only semi-automated. SKYLOCK and similar systems also suffer from a limited range of coverage.

Responsive to the detection of an approaching drone by systems like DRONEDNA/SKYLOCK, a determination is made as to whether the approaching drone has authorization to be in the air space and an assessment is made as to the threat level of the approaching drone. If the approaching drone is not authorized to be in the air space and/or is deemed to be a sufficient threat, efforts are made to neutralize the approaching drone.

Currently, there are three primary methods to neutralize drones: jamming, hacking, and destroying. Typically, jamming entails disrupting a drone by generating a signal (e.g., electromagnetic, RF, ultrasonic, etc.) having a power level sufficient to interfere with, or "drown out" any communications between the drone and its pilot. Readily available products, such as an RF drone signal jammer, emit signals strong enough to interfere with the communications between a drone and its pilot. However, these jammers are limited in the event the drone operates autonomously or in a mode that neither emits nor receives electromagnetic signals of any kind from an external source in order to operate.

Hacking typically entails taking control of a drone directly. Conventional techniques for hacking may include "spoofing" control signals in order to trick the drone into thinking it is being controlled by the intended operator. However, successfully hacking a drone presumes adequate knowledge of control/communications protocols and/or commands used in operating the drone.

Destroying a UAV entails using physical force sufficient to destroy the approaching drone. While commercially available drones such as the PHANTOM 4 PRO, offered by DJI of Shenzhen, China are easily destructible, military-grade UAV are not. In fact, destroying a military-grade UAV may necessitate the use of military-grade defense systems, such as Patriot and/or Hawk missile systems, which are extremely expensive and are prone to damaging the surrounding environment.

To go undetected by DRONEDNA/SKYLOCK or other similar systems, UAVs made of irreflective material, that emit very small signals, and/or that fly at night can be produced. Therefore, there is a need for a system capable of detecting an unauthorized UAV regardless of composition, the strength of emitted signals (e.g., RF, ultrasonic, electromagnetic, etc.), the time of day at which the drone is flown, or other characteristics intrinsic to the UAV that the system is trying to detect. To overcome these technical limitations and produce a drone detection system that is cost-feasible and that minimizes collateral damage to the surrounding environment, advances in the field of drone-detection technology are needed.

Accordingly, it is an object of the present disclosure to provide methods and systems for a distributed airborne acoustic anti drone system which can detect a UAV approaching a protected site, predict a route or routes toward the protected site which the approaching UAV may traverse, and alert the protected site of the predicted route(s) of the approaching UAV.

SUMMARY

In an exemplary embodiment, a distributed airborne acoustic anti-drone intelligence system (DAAADS) for detecting trajectories of an unmanned aerial vehicle (UAV, or "drone") approaching a protected site is described. The DAAADS includes multiple airborne defense agents (ADAs), each located at a fixed distance/radius from the protected site and equidistant from each other ADA. Also included in the system is a base station including a wideband communications line configured to communicate with a transceiver included in each ADA and the protected site. A control center located within the base station (BS-CC) is programmable to aggregate data corresponding to the directions and distances of an approaching UAV, to predict a route or routes toward the protected site which the approaching UAV may traverse, and to alert the protected site of the predicted route(s) of the approaching UAV.

In another exemplary embodiment, a method includes detecting, via ADAs, trajectories of UAVs approaching a protected site. Detection is achieved by switching each directional microphone included in a directional microphone array of each ADA on and off during consecutive time periods. Only one directional microphone is on in any given time period. During on periods, acoustic signals generated by UAVs approaching the protected site are detected.

Circuitry included in each ADA estimates an angle of approach and a distance of each approaching UAV from each ADA over a first and a second time period and transmits these estimates to a base station. Using the estimated distance, circuitry included in the base station divides by the difference between the first and the second time period to estimate a speed of each UAV. The angles of approach, distances, and speeds of the approaching UAVs are aggregated to predict routes towards the protected site. An alarm is transmitted to the protected site when the predicted route of at least one approaching UAV intersects with the protected site.

In another exemplary embodiment, a non-transitory computer readable medium having instructions stored thereon that, when executed by one or more processors, cause the one or more processors to perform a method for detecting trajectories of unmanned UAV approaching a protected site, the site being protected by multiple ADAs. To detect the trajectories of the approaching UAV, each directional microphone of a directional microphone included in each ADA is switched on and off during consecutive time periods. Only one directional microphone is on in a given time period. Acoustic signals generated by the approaching UAVs are detected during consecutive on periods.

During a first time period, a first circuitry included in an ADA estimates an angle of approach and a distance of approach of each approaching UAV from each ADA. During a second time period, the first circuitry estimates an angle of approach and a distance of each approaching UAV form each ADA. Estimated angle of approach and distance from each ADA are transmitted to a base station.

A second processing circuitry, included in the base station, estimates a speed of each UAV by subtracting the distance estimated during a first on time period from the distance measured during a second on time period for each of three equidistance ADAs and dividing by the difference by the difference between the first and second time periods. Angles of approach, distances, and speeds of the approaching UAVs are aggregated to predict routes towards the protected sites of the approaching UAVs. An alert is transmitted to the protected site when the route of at least one of the approaching UAV intersects with the protected site.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
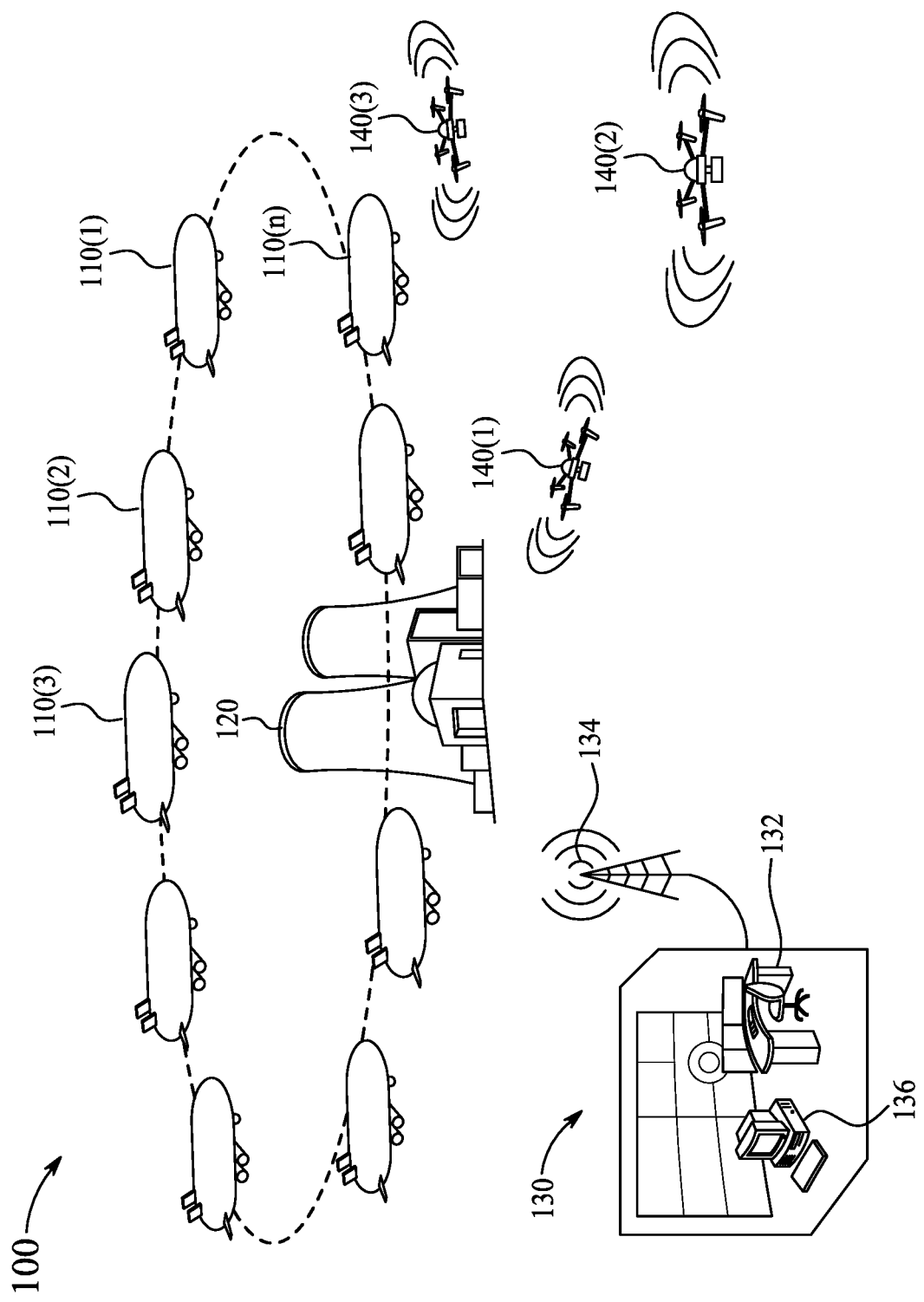
FIG. 1 is an illustration of a distributed airborne acoustic anti-drone intelligence system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or 5%, and any values therebetween.

Aspects of the present disclosure are directed to a system, device, and method for a distributed airborne acoustic anti-drone intelligence system (DAAADS) which is a fully automated, dynamic, scalable, remote, intelligent, and long-range distributed system for detecting trajectories of an unauthorized, potentially malicious/hostile UAV approaching a protected site. By utilizing (e.g., sensing) acoustic signals and generating a reliable stream of data from those signals, the DAAADS is able to intercept the UAV approaching the protected site. In some examples, "generating a reliable stream of intelligence" may include using sensed acoustic data to calculate a speed/angle of approach of a detected UAV, and predicting possible trajectories of the detected UAV based on the calculated speed/angle of approach. The predicting possible trajectories of the detected, approaching UAV may be performed by circuitry included in the ADAs comprising the DAAADS, the base station, the BS-CC located in the protected zone, or in any combination thereof.

FIG. 1 depicts a distributed airborne acoustic anti-drone intelligence system (DAAADS) 100 for detecting trajectories of unmanned aerial vehicles (UAVs) approaching a protected site in accordance with embodiments of the present disclosure. Airborne Defense Agents 110(1), 110(2), 110(3), . . . , 110(n) (collectively, "the ADAs 110") are shown surrounding a protected site 120. Included in the protected site 120 is a base station 130 having a control center (a BS-CC) 132 that is in communications with the ADAs 110. Communications between the ADAs 110 and the BS-CC 132 may be enabled via any number of wireless communications protocols including, but not limited to Bluetooth, WiFi, 2G/3G/4G/LTE/5G, ZigBee, NFC, RFID, and all variants thereof. Also depicted in FIG. 1 are attacking agents 140(1), 140(2), and 140(3) (collectively "the AAs 140"). The AAs 140 are unmanned aerial vehicles (UAVs, or drones) approaching the protected site 120. In various embodiments, the AAs 140 lack authorization to be in the protected site 120 and/or may be hostile UAVs having malicious intent.

Each of the ADAs 110 is located at a fixed radius from protected site 120 and equidistant from each other ADA of the ADAs 110. Each of the ADAs 110 is equipped with a microphone array (shown in FIG. 3) configured to detect acoustic signals emitted by a UAV.

Included in each of the ADAs 110 is a computing device (also shown in FIG. 3) including a computer-readable medium comprising programming instructions executable by processing circuitry. Responsive to execution of the programming instructions, the processing circuitry determines a direction and a distance of each of the AAs 140 from each of the ADAs 110. In various embodiments, the computing device includes switching circuitry configured to switch the power of each directional microphone ON and OFF in an alternating sequence. In accordance with the present disclosure, each directional microphone of the directional microphone array may be oriented to receive acoustic signals from a different angle. Moreover, each computing device may include circuitry configured to measure an amplitude, A, of each acoustic signal during the alternating ON periods.

Each processing circuitry of the ADAs 110 may be further configured to detect an angle of arrival, co, of the acoustic signal from the angle of the directional microphone receiving the greatest amplitude. Each processing circuitry of the ADAs 110 can then estimate the distance between each of the ADAs 110 and each of the AAs 140 by measuring a propagation delay, r, of the acoustic signal having the greatest amplitude. Moreover, the processing circuitry may be configured to convert the acoustic signals from the time domain to the frequency domain, identify a set of frequency components, and estimate the distance to the sound source.

Figure 3:
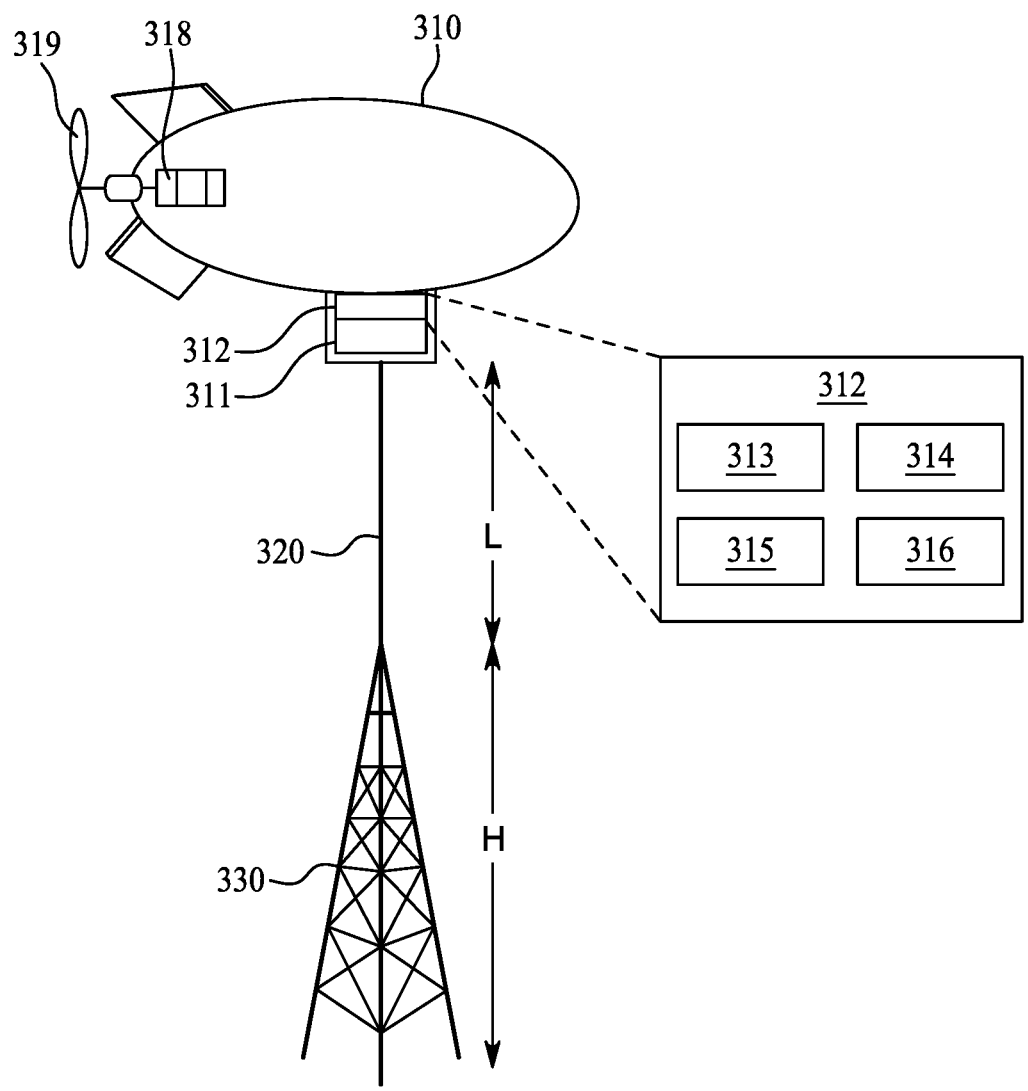
FIG. 3 illustrates tethering an airborne defense agent to a tower, according to certain embodiments.

Each of the ADAs 110 may also include GPS receiver circuitry (314, shown in FIG. 3) along with (wireless) transceiver circuitry (315, FIG. 3). The GPS receiver circuitry can be configured to locate the respective ADA of the ADAs 110 in a three-dimensional space. Each of the ADAs 110 may further include a motor, a propeller, and navigation circuitry (318, 319, 316, FIG. 3) configured to cause a respective ADA of the ADAs 110 to hover at a fixed height from the ground, at a fixed radius from the protected site, and equidistant from each other ADA of the ADAs 110.

The DAAADS 110 further includes a BS-CC 132 configured with a wideband communications link 134 to communicate with the transceiver of each of the ADAs 110 and protected site 120. In embodiments, the BS-CC 132 may be configured to transmit position signals to the navigation circuitry included in each of the ADAs 110 to control the position of a respective ADA of the ADAs 110. The BS-CC 132 may be further configured via a computing device 136 including a computer-readable medium comprising program instructions, executable by processing circuitry, to cause the processing circuitry to aggregate the directions and distances of approaching AAs 140 to predict routes towards the protected site and to alert the protected site of the predicted route of each of the AAs 140 while approaching protected site 120. The computing device 136 may be a personal computing device, a laptop, a mainframe, a server, a database, or any combination thereof.

In accordance with the present disclosure, the processing circuitry of the BS-CC 132 may be configurable to transmit control signals to each of the ADAs 110 to switch the directional microphone arrays included therein ON and OFF simultaneously. Moreover, the second processing circuitry may be further configurable to predict the route of a respective AA of the approaching AAs 140 by triangulating the acoustic signals received by the directional microphone arrays of three equidistant ADAs of the ADAs 110. Further, the second processing circuitry may also include a machine learning processor configured to predict the route of each of the approaching AAs 140 toward protected site 120. The second processing circuitry may also be configured to estimate the speed of each of the AAs 140 by subtracting the distances estimated by each of the three equidistant ADAs of the ADAs 110 at a first ON period from the distances estimated at a second ON period and dividing the difference by the time between the first ON period and the second ON period.

Figure 2:
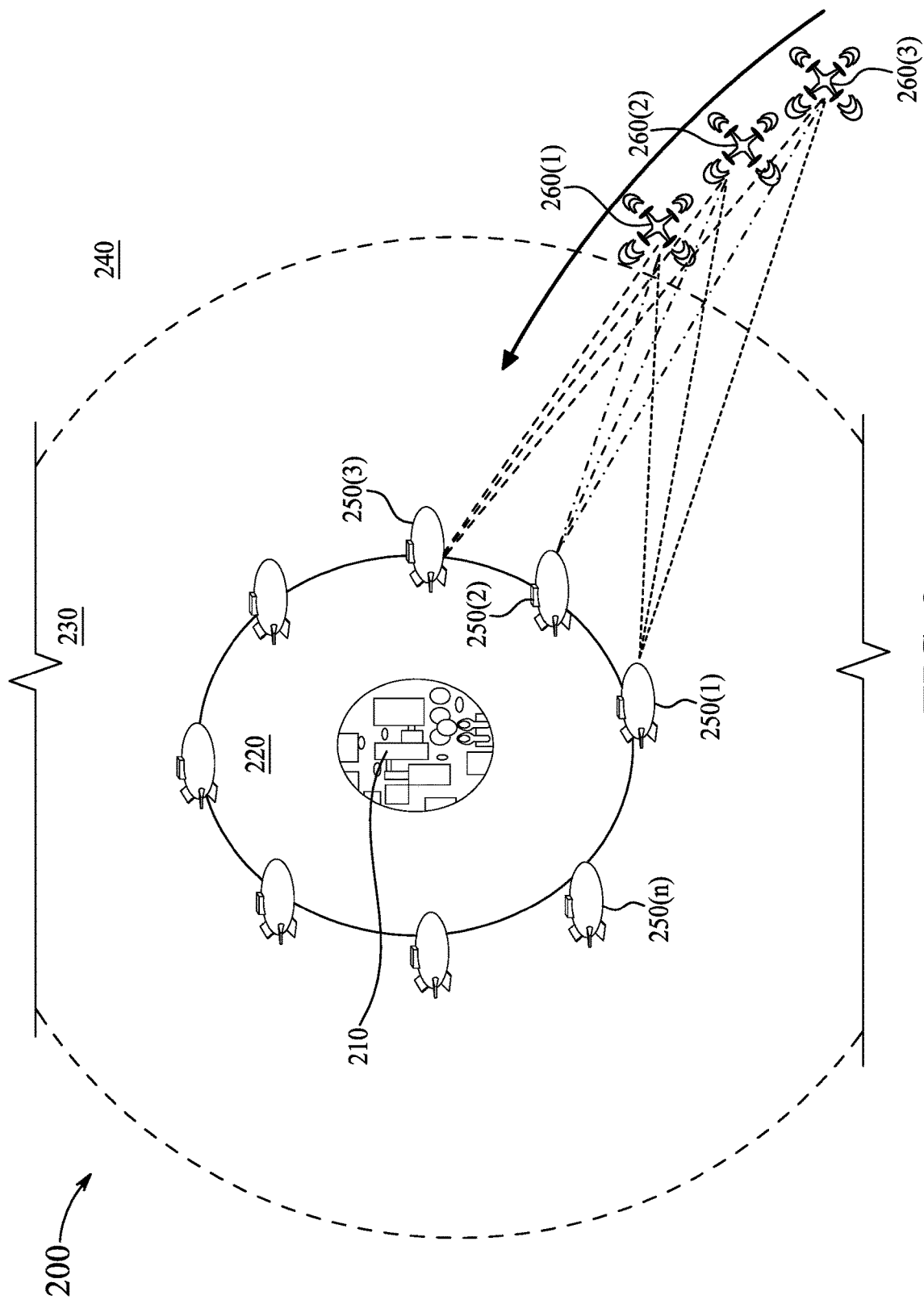
FIG. 2 is an illustration of a distributed airborne acoustic anti-drone intelligence system surrounding a protected site, according to certain embodiments.

FIG. 2 illustrates the taxonomy of protected region 200, a region which may be protected by a DAAADS substantially similar/identical to DAAADS 100. Included in protected region 200 is protected site 210. Protected site 210 may be substantially similar/identical to protected site 110 described above. Protected region 200 also includes a demilitarized zone (DMZ) 220, a detection/reaction (D/R) zone 230, and a sensing zone 240. Airborne defense agents 250(1), 250(2), 250(3), . . . , 250(n) (collectively "the ADAs 250") surround the perimeter of the DMZ 220 and the D/R zone 230, and detect approaching attacking agents 260(1), 260(2), and 260(3) (collectively "the AAs 260").

Included in protected site 210 are a variety of communications facilities, synchronization facilities, and computation facilities and a base station (which may be substantially similar/identical to base station 130), and included in the base station is a control center, or BS-CC (which may be substantially similar/identical to BS-CC 132). The BS-CC is programmable to communicate with the various communications facilities, synchronization facilities, and/or computation facilities throughout protected site 210 and the ADAs 250 to aggregate data on the AAs 260 approaching protected site 210. Communications between the BS-CC and the facilities/the ADAS 250 may be enabled via a variety of wireless communications protocols including Bluetooth, WiFi, 2G/3G/4G/LTE/5G, ZigBee, NFC, RFID, and all variants thereof. The aggregated data may correspond to the directionality and distance of an approaching AA of the AAs 260 from protected site 210. The aggregated data may be used calculate the speed of the AAs 260 and/or to predict a route/trajectory of a respective AA of the AAs 260 on approach. A threat level of approaching AAs 260 may be assessed based on these calculations. Based on the assessed threat level, alarms may be sounded throughout protected site 210.

The coordinates of each individual ADA of the ADAs 250 are known, and each individual ADA is used to sense a specific area. In some embodiments, the ADAs 250 may be air balloons. In other aspects, the ADAs 250 may be blimps, helicopters, drones, or any other type of aircraft able to hover in or otherwise maintain a relatively steady position. Each ADA may include a directional microphone array and/or an electronically driven loop forming directional microphone system configured to sense acoustic signals emitted from UAVs (e.g., AAs 260) approaching protected site 210. Each ADA may also include a variety of other sensors/circuitry, such as a frequency analyzer, a power meter, timers, and GPS/navigational circuitry configured to measure/aggregate data related to the speed/position (e.g., distance from) relative to protected site 210. Each ADA may also include computational circuitry configured to calculate the speed and/or position of an approaching UAV and predict trajectories of the approaching UAV therefrom. The trajectories may be estimated using any machine learning algorithm including, but not limited to, supervised/unsupervised/semi-supervised learning algorithms, regression-based algorithms, clustering algorithms, Bayesian algorithms, decision tree algorithms, regularization algorithms, instance-based algorithms, association rule learning algorithms, artificial neural network algorithms, deep learning algorithms, or any combination thereof.

In some aspects of the present disclosure, and as is covered greater detail in the ensuing discussion of FIG. 3, each of the ADAs 250 may be hovering in a fixed position. To fix the ADAs 250 in place, each ADA may be tethered (e.g. via a rope or chain) to a communications tower or other structure configurable to facilitate wireless communications. In other embodiments, each of the ADAs 250 may hover above a communications tower, but not be restricted by a tether. In still other embodiments, each of the ADAs 250 or a combination of individual ADAs may be untethered and able to fly around protected region 200. In these instances, each of the untethered ADAs may be able to fly around protected region 200 freely, or may fly in a fixed formation.

Sensing zone 240 surrounds the D/R Zone 230, and is the outermost section of protected region 200. The AAs 260 are depicted as flying in sensing zone 240 approaching protected site 210. While the AAs 260 are in sensing zone 240, intelligence is gathered (e.g., emitted acoustic signals are measured) in order to categorize behavior and to predict trajectory. Predictions as to behavior and trajectory of the AAs 260 are made by the BS-CC included in protected site 210. As mentioned above, each of the ADAs 250 included in the DAAADS may be hovering around a protected site in a fixed position.

FIG. 3 illustrates an ADA 310 connected to a tether 320, having length, L. The tether 320 is connected is connected to a tower 330 having height, H. In some embodiments, the DAAADS may include a plurality of towers 330 of height H throughout a protected region. Each tower 330 may be located a fixed radius from the protected site and equidistant from each other tower. A top portion of each fixed tower 330 is connected to one of a plurality of tethers 320 (e.g., ropes, chains, etc.), each tether 320 of length L. Each ADA may include an air balloon 312, each air balloon having a lower mount, may be attached via the lower mount to tether 320. Each air balloon is configurable to hold the first computing device and the directional array of an ADA 310 at a fixed height L+H above the ground.

Also depicted in FIG. 3 and as referenced throughout the descriptions of FIG. 1 and FIG. 2 are directional microphone array 311, critical circuitry 312 motor 318, and propeller 319. In accordance with the present disclosure, a directional microphone array 311 senses acoustic signals emitted from an approaching attacking agent. Included in critical circuitry 312 are a computing device 313 executing code for determining a direction and a distance of each UAV approaching ADA 310, a GPS receiver 314 configured to locate the ADA in a three-dimensional space, and transceiver circuitry 315 for sending/receiving wireless communications signals. Motor 318 may drive propeller 319 such that ADA 310 is able to hover at a fixed height of H+L above the ground. Critical circuitry 312 may further include navigation circuitry 316. Navigation circuitry 316 may include the GPS receiver 314 or it may provide navigation capabilities in addition thereto.

Figure 4:
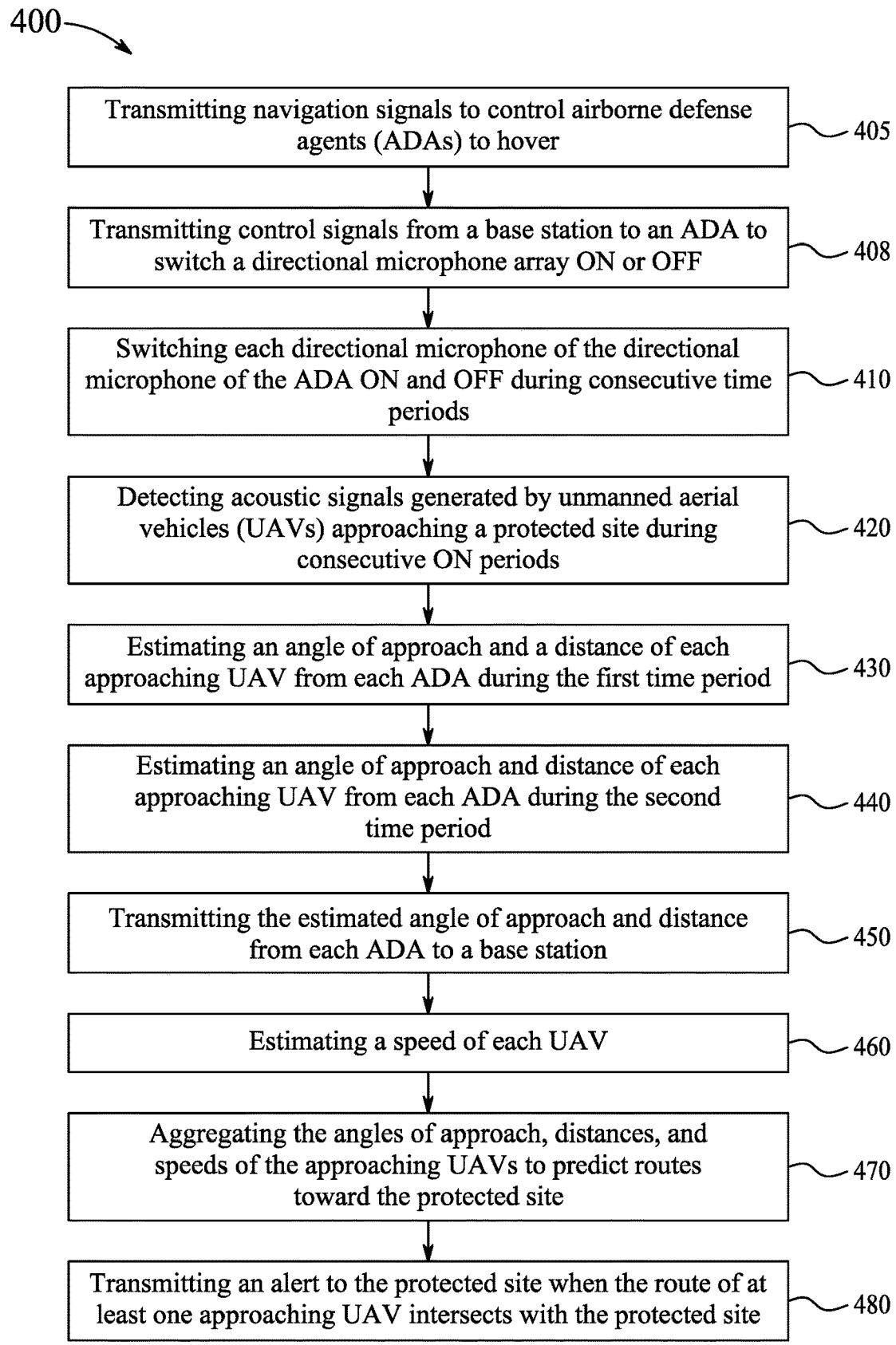
FIG. 4 is an exemplary flowchart of a method for implementing a distributed airborne acoustic anti-drone intelligence system, according to certain embodiments.

FIG. 4 is a flowchart describing a method 400 for detecting trajectories of unmanned aerial vehicles (UAV) approaching a protected site by a plurality of airborne defense agents (ADAs). The method 400 includes, at a step 410, switching each directional microphone of a directional microphone array of an ADA ON and OFF during consecutive time periods in which only one directional microphone is ON in a time period. At step 420, acoustic signals generated by UAVs approaching the protected site during consecutive ON periods are detected. A first processing circuitry of an ADA estimates an angle of approach and a distance of each approaching UAV from each ADA during the first time period at step 430. At a step 440, during the second time period, an angle of approach and distance of each approaching UAV from each ADA is estimated.

The estimated angle(s) of approach and distance(s) from each ADA are transmitted to a base station at step 450. A second processing circuitry included in the base station estimates, at a step 460, a speed of each UAV. The estimating may include subtracting the distance estimated during a first ON time period from the distance measured during a second ON time period for each of three equidistant ADAs and dividing by the difference between the first and second time periods. At step 470, the angles of approach, distances, and speeds of the approaching UAVs are aggregated to predict routes towards the protected site. At step 480, an alert is transmitted to the protected site when the route of at least one approaching UAV intersects with the protected site.

In some aspects of the present disclosure, the base station may perform an optional step 405 to transmit to each ADA navigation signals to control the ADAs to hover at a fixed height from the ground, at a fixed radius from the protected site, and equidistant from each other ADA. Additionally and/or alternatively, the method 400 for detecting trajectories of unmanned aerial vehicles (UAV) approaching a protected site may include an optional step 408 for transmitting control signals from the base station to each ADA to switch each directional microphone array ON to start detecting acoustic signals or OFF to sleep based on a number of approaching UAVs.

The first processing circuitry of each ADA may convert the acoustic signals from the time domain to the frequency domain. Any signal processing technique known in the art may be used to perform the conversion from the time domain to the frequency domain. Responsive to conversion into the frequency domain, a set of frequency components is identified, and distance to an approaching UAV is estimated using the set of frequency components.

Each directional microphone of the directional microphone array of an ADA may be oriented to receive acoustic signals from a different angle. The first processing circuitry may measure an amplitude, A, of each acoustic signal during the alternating ON periods. An angle of arrival, ω, of the acoustic signal may be detected from the angle of the directional microphone receiving the greatest amplitude. Estimates of the distance between each ADA and a UAV may be made by measuring a propagation delay, τ, of the acoustic signal having the greatest amplitude.

The second processing circuitry may predict the route of an approaching UAV by triangulating the acoustic signals received by the directional microphone arrays of three equidistant ADAs. Further, the second processing circuitry may apply the aggregated angles of approach, distances, and speeds of the approaching UAVs to a machine learning processor to predict the routes of the approaching UAVs. In some embodiments, the machine learning processor may be included in the BS-CC and may implement a machine learning algorithm to predict the routes/trajectories of the approaching UAV. Examples of the machine learning algorithms include, but are not limited to, supervised/unsupervised/semi-supervised learning algorithms, regression-based algorithms, clustering algorithms, Bayesian algorithms, decision tree algorithms, regularization algorithms, instance-based algorithms, association rule learning algorithms, artificial neural network algorithms, deep learning algorithms, and/or a combination thereof.

In related aspects, a non-transitory computer readable medium having instructions stored thereon that, when executed by one or more processors, cause the one or more processors to perform a method for detecting trajectories of unmanned aerial vehicles (UAV) approaching a protected site by a plurality of airborne defense agents (ADAs). The method may include switching each directional microphone of a directional microphone array of an ADA ON and OFF during consecutive time periods in which only one directional microphone is ON in a time period. Acoustic signals generated by UAVs approaching the protected site may be detected during consecutive ON periods. A first processing circuitry of an ADA may estimate an angle of approach and a distance of each approaching UAV from each ADA during the first time period. Furthermore, an angle of approach and distance of each approaching UAV from each ADA may be estimated during the second time period.

The estimated angle(s) of approach and distance(s) from each ADA may be transmitted to a base station. A second processing circuitry included in the base station may estimate a speed of each UAV by subtracting the distance estimated during a first ON time period from the distance measured during a second ON period for each of three equidistant ADAs and dividing by the difference between the first and second time periods. Distances and speeds of the approaching UAVs are aggregated to predict routes towards the protected site of the approaching UAV. Finally, an alert may be transmitted to the protected site when the route of at least one approaching UAV intersects with the protected site.

The non-transitory computer readable medium may also orient each directional microphone of the directional microphone array of an ADA to receive acoustic signals from a different angle. Processing circuitry of the ADA may be used to determine an amplitude (A) of each acoustic signal during the alternating ON periods. Further, the processing circuitry may also detect an angle of arrival (ω) of the acoustic signal based on the orientation of the directional microphone array sensing the acoustic signal having the largest amplitude.

Moreover, the processing circuitry may estimate the distance between the ADA and an approaching UAV by measuring a propagation delay (τ) of the acoustic signal having the greatest amplitude.

The non-transitory computer medium may also predict, by the second processing circuitry included in the base station, the route/trajectory of each approaching UAV by triangulating the acoustic signals received by the directional microphone arrays of three equidistant ADAs. The second processing circuitry may apply aggregated angles of approach, distances, speeds, and predicted routes of the approaching UAVs to a machine learning processor to predict the routes which intersect with the protected site. To predict the routes of the approaching UAV, the machine learning processor may implement any machine learning algorithm including, but not limited to, supervised/unsupervised/semi-supervised learning algorithms, regression-based algorithms, clustering algorithms, Bayesian algorithms, decision tree algorithms, regularization algorithms, instance-based algorithms, association rule learning algorithms, artificial neural network algorithms, deep learning algorithms, and/or a combination thereof.

FIGS. 5-12 provide more detailed descriptions of the functionality of (e.g., the various tasks executed by) the DAAADS in detecting a UAV approaching a protected site. It is to be understood that there may be multiple different ways to perform these tasks in addition to what is described in FIGS. 5-12, and/or there may be multiple iterations for performing what is described.

Figure 5:
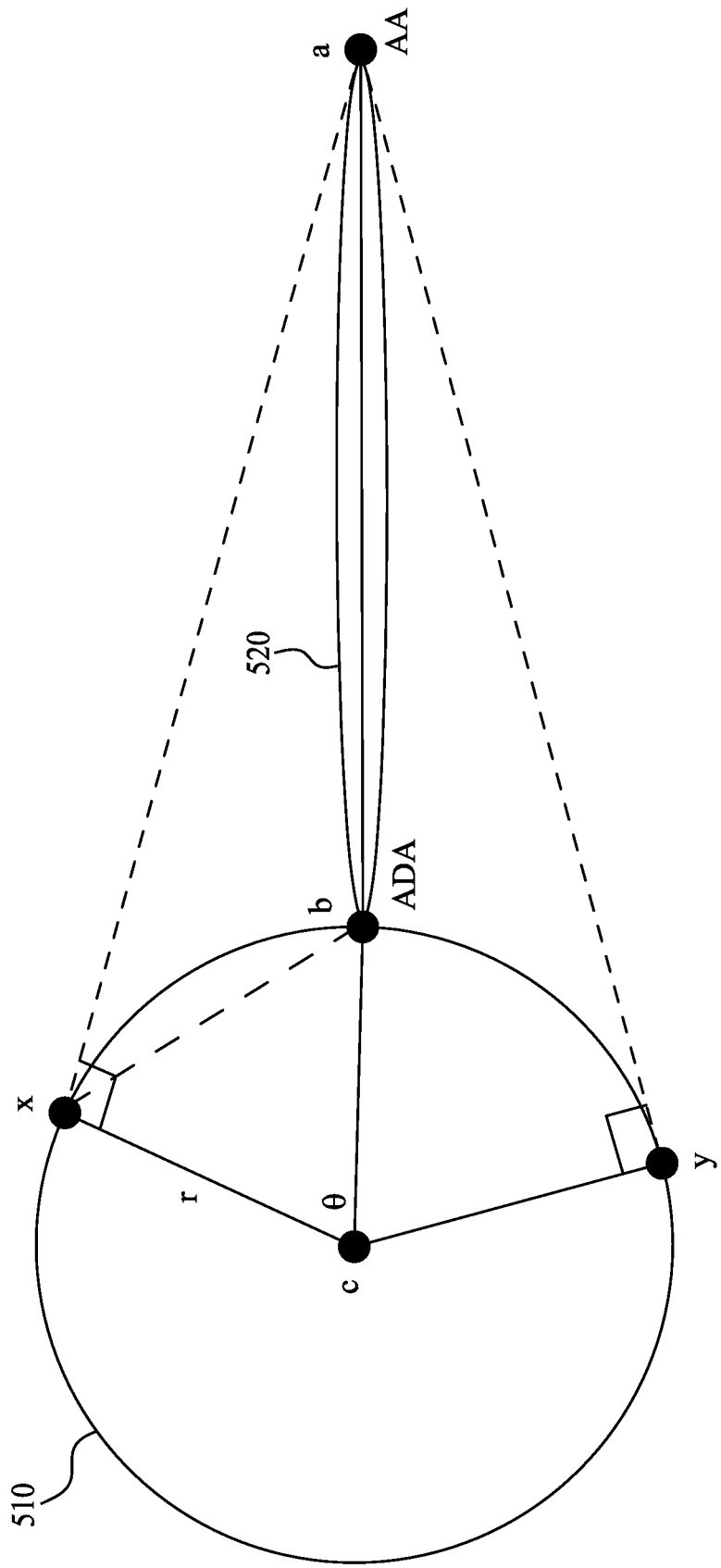
FIG. 5 illustrates a microphone pattern for predicting the direction of an incoming attack on a protected site, according to certain embodiments.

FIG. 5 illustrates one process by which DAAADS may predict the direction of an incoming attack from an attacking agent (AA) approaching protected region 510, having center, C, and radius, r. For the purposes of predicting direction of an incoming attack, points x, y, and b around the circumference of protected region 510 are of interest, as is point a. As illustrated, an airborne defense agent (ADA) is located at point b and the AA is located at point a. Microphone pattern 420 is indicative of the acoustic signal emitted by the AA at point a and sensed by ADA at point b. Based on microphone pattern 520, the initial coordinate of AA is estimated.

Estimating the initial position of the approaching AA may initiate an early alarm, the alarm indicating that an imminent threat may be approaching protected region 510 from a specific direction. The length of line segment ab, or the in a straight line between the AA at point a and the ADA at point b, may be calculated based on the propagation delay of the sound originating at the AA multiplied by the speed of sound (approximately 343 m/s).

To improve estimates as to the location of the AA, three points around the protected region 510 may be used to triangulate the position of the AA. As illustrated, points x, y, and b are these three points. Initially the locations (e.g., coordinates) of points b and a are known, and are used in determining the locations of points x and y. First, tangents to the protected region 510, one above and one below the known location the ADA (e.g., point b) passing through the known location of the AA (e.g. point a), are taken. The intersections of these tangent lines with protected region 510 are the points x and y. Additionally and/or alternatively, by approximating θ≈60°, the coordinates of x and y can be approximated. After establishing the three fixed points, x, y, and b, it is possible to estimate the coordinates of the attack in a three-dimensional space via triangulation using the edges of the right triangles (e.g., ΔCXA and ΔCYA).

Figure 6:
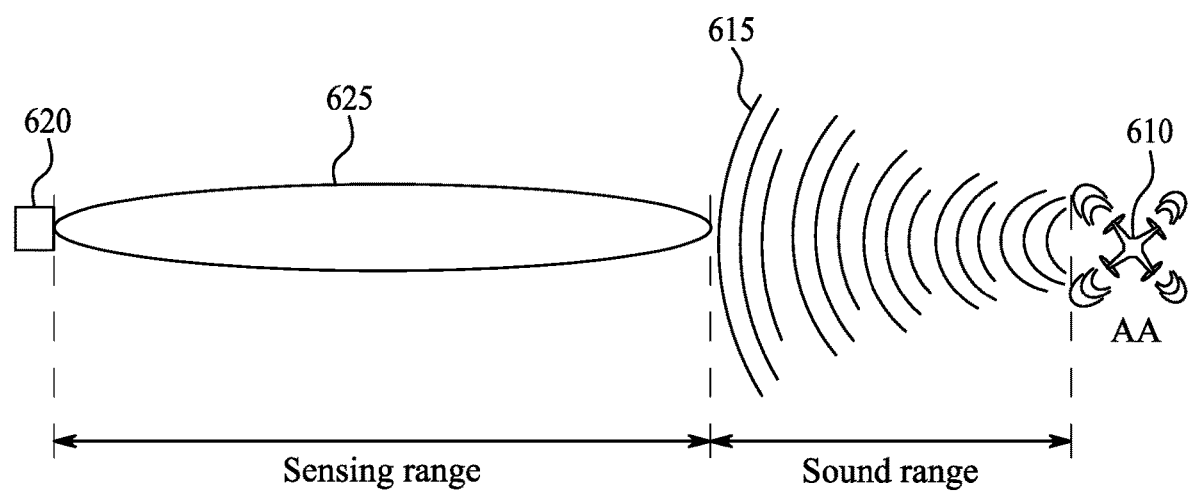
FIG. 6 is an exemplary illustration of an acoustic signal emitted by an approaching attacker, as detected by an airborne defense agent, according to certain embodiments.

FIG. 6 illustrates the sound components involved in an ADA 620 sensing/detecting an approaching AA 610. As sound waves 615 are emitted from the approaching AA 610, the sound waves 615 will be detectable by the array of microphones in ADA 620 once the sound waves 615 have entered the sensing zone of the microphone array. The sensing zone of the microphone array is indicated by a microphone pattern 625 which may be substantially similar/identical to the microphone pattern 520. To track the approaching AA 610 as accurately as possible, the low frequency components of sound waves 615 are monitored. Tracking the lower frequency components of sound emitted from approaching AA 610 is more effective. Given the longer wavelength of lower frequency sound waves, lower frequency components of sound waves 615 will propagate further away from their source (e.g., AA 610) than the higher frequency components of sound waves 615.

The AA 610 can be detected by sounds generated (e.g., by its motor, propeller, wind impacting it body), which serve as the origin of sound waves, depicted as 615, which traverse the sound range shown in FIG. 6. The ADA 620 has a sensing range corresponding to microphone pattern 625 in which incoming sounds can be sensed. As sound waves 615 cross into microphone pattern 625, the frequency spectrum of sound waves 615 can be analyzed. The ADA 620 may transmit data collected about sound waves 615 to a BS-CC substantially similar/identical to the BS-CCs described above (e.g., BS-CC 132) for analysis.

Figure 7:
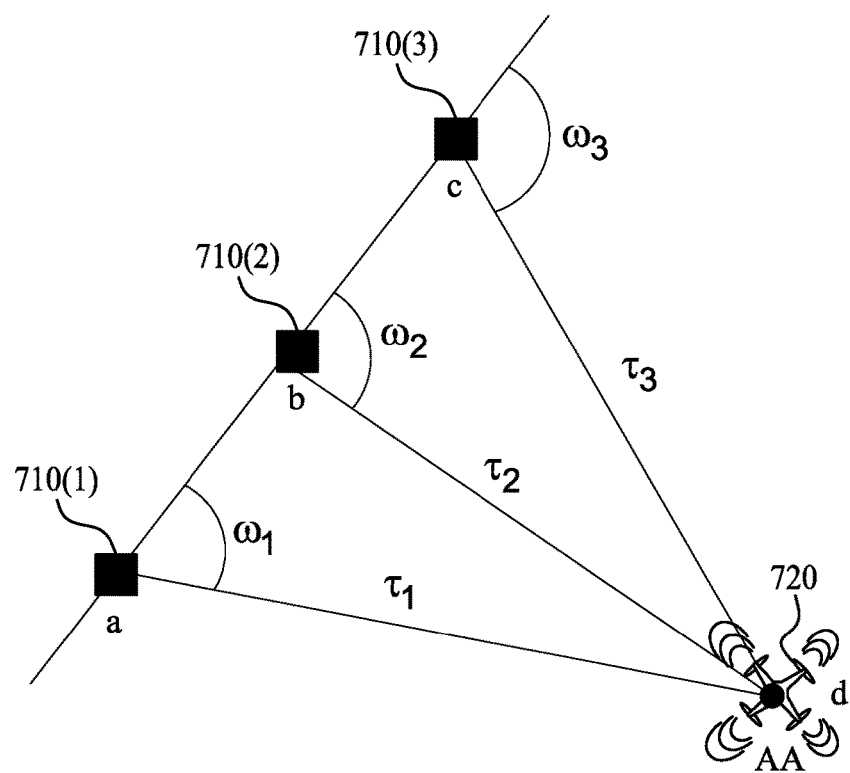
FIG. 7 illustrates position triangulation of an attacking agent approaching a protected site by airborne defense agents surrounding the protected site, according to certain embodiments.

FIG. 7 provides further detail on the localization/triangulation of an AA approaching a protected site by three ADAs. Three ADAs, 710(1), 710(2), and 710(3) (collectively "the ADAs 710") are shown detecting approaching AA 720. To triangulate the position of AA 720 (e.g., find the coordinates of AA 720 in a three-dimensional space), the ADAs 710 sense acoustic signals emitted by AA 720. Responsive to sensing the acoustic signals, each ADA of the ADAs 710 establishes a relative location by determining a propagation delay ($\tau$) and angle of arrival (w) of the sensed acoustic signals using the array of directional microphones included in each respective ADA of the ADAs 710. Propagation delays are measured while angles of arrivals are estimated.

FIG. 7 illustrates each respective ADA of the ADAs 710 having a measured propagation delay and an estimated angle of arrival of the sensed acoustic signal emitted from attacking agent (AA) 720. For example, ADA 710(1), located at point a, uses the acoustic signal(s) emitted from AA 720 to measure a propagation delay $\tau_1$ and to estimate an angle of arrival $\omega_1$ of AA 720. Similarly, ADA 710(2), located at point b, measures a propagation delay ($\tau_2$) and estimates an angle of arrival ($\omega_2$) of the acoustic signals emitted from AA 720, and ADA 710(3), located at point b, measures a propagation delay ($\tau_3$) and estimates an angle of arrival ($\omega_3$) of the acoustic signals emitted from AA 720. A combination of these measurements and estimations may be used to triangulate the position of AA 720 as it approaches. Lengths of the sides of the triangles $\Delta abd$ and $\Delta bcd$ formed between the ADAs 710 and AA 720 (e.g., the line segments ad, bd, and cd) may be used to calculate the position of AA 720 in a three-dimensional space.

Although FIG. 7 depicts three ADA (710(1), 710(2), and 710(3)) triangulating the position of AA 720 as it traverses distance x, in accordance with the present disclosure, it is possible to triangulate the position of AA 720 with four, five, ten or more ADA depending on various factors, including but not limited to the trajectory of the approaching AA and the formation of the ADA. Provided there are no restrictions/limitations caused by system overhead (e.g., insufficient bandwidth), all ADA in included in the DAAADS may track an approaching AA at once. In general, the more ADA that are triangulating the position of an approaching AA, the more accurate the results will be.

Figure 8:
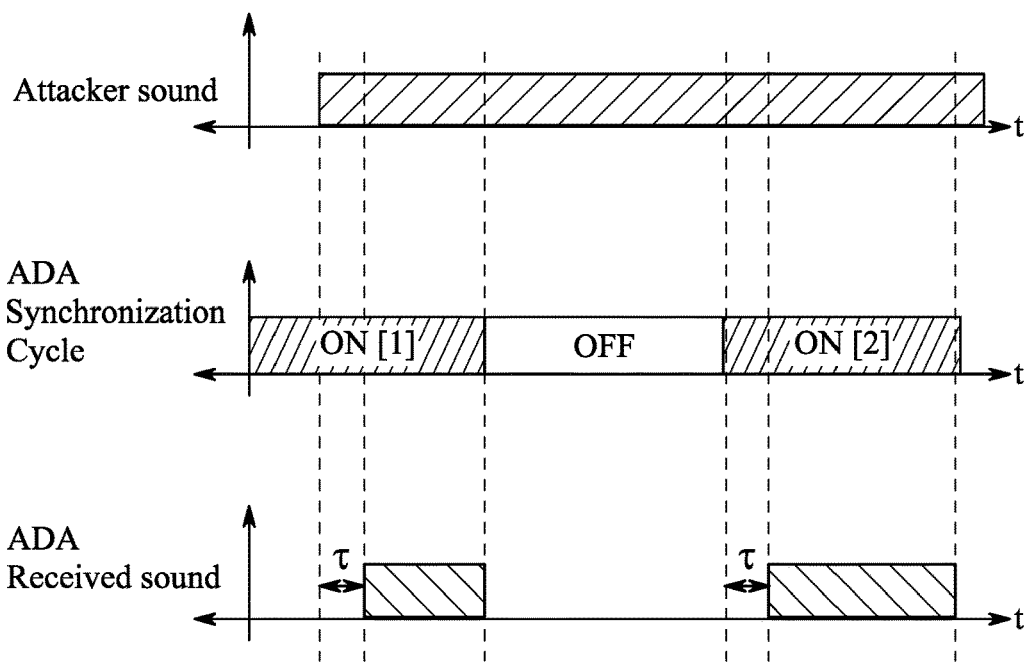
FIG. 8 illustrates measurement of a propagation delay of an acoustic signal emitted by an attacking agent, according to certain embodiments.

FIG. 8 illustrates measurement of propagation delay, or the time required for a sound to travel from the source/origin of the sound to a location/object sensing that sound. In accordance with the present disclosure, an attacking agent emitting acoustic signals serves as the source/origin and an airborne defense agent sensing acoustic signals emitted from an attacking agent serves as the sensing object. Synchronizing ADAs to a reference channel enables the ADAs to listen to the same acoustic signals at the same time, enabling propagation delay, $\tau$, to be measured. Propagation delay may be measured by switching ON and OFF microphone arrays included in the ADAs simultaneously and periodically.

As illustrated in FIG. 8, an ADA may measure $\tau$ during a first ON cycle (ON[1]). The acoustic signal emitted from an AA is sensed after propagating for r seconds, but there is no way to distinguish the propagation time from the origination time. To resolve this issue, a measurement of $\tau$ is made during a second ON cycle (ON[2]) to start the ON cycle. Minimum and maximum values of $\tau$ may be identified according to system specifications and any measured delay should fit within that range. For instance, the maximum value for $\tau$ may be based on the maximum sensing range of the system while the minimum value of $\tau$ may be based on the sensitivity of the measurement device(s) (e.g., the microphone array included in each ADA(s) sensing the emitted acoustic signal(s)). Also illustrated in FIG. 8 is the ADA receiving the emitted acoustic signal, after the propagation delay $\tau$, and during each of the first and second ON cycles.

Figure 9:
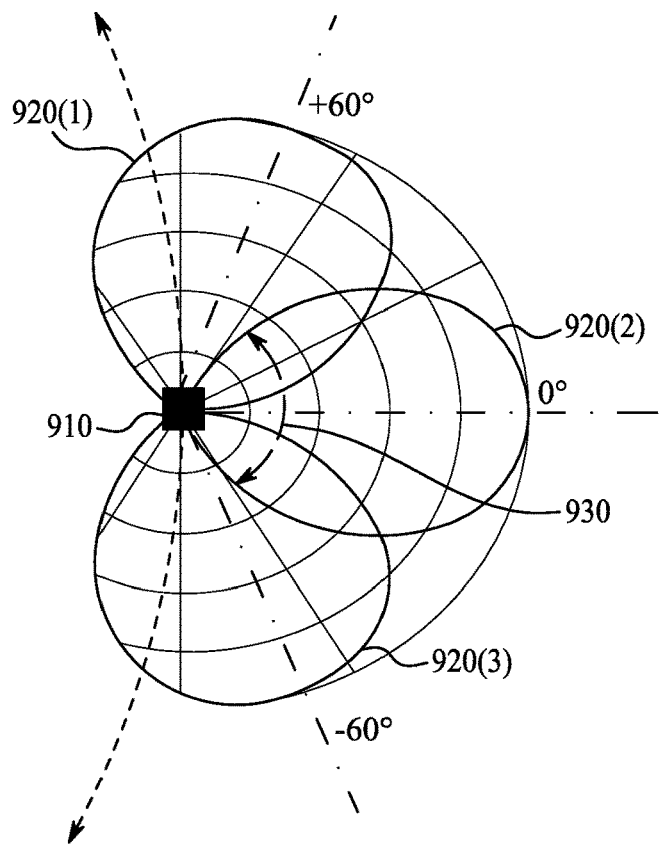
FIG. 9 depicts a process by which an angle of arrival of an attacking agent approaching a protected site is estimated, according to certain embodiments.

FIG. 9 depicts a process by which an angle of arrival ($\omega$) may be estimated. The array of microphones included in an ADA (e.g., ADA 910) has three loops, loop 1 (920(1)), loop 2 (920(2)), and loop 3 (920(3)) (collectively "the loops 920"), each separated by 60°. The angle of arrival is associated with the loop in which the strongest acoustic signal is received. For instance, if the strongest acoustic signal is sensed within loop 1 (920(1)), angle of arrival is estimated to be +60°. To associate the received acoustic signal to any of the loops, ADA 910 may switch the power between the loops in an alternating fashion, thereby enabling ADA 910 to determine which of the loops 920 is receiving the strongest signal (e.g., the signal having the highest power). To improve the accuracy of the estimation of the angle of arrival, more loops may be included. More loops may be included by narrowing/decreasing the beam width 930 of any/all of the loops 920 of the microphone array. Decreasing the beam width of the loops 920 also serves to reduce interference between individual loops of the microphone array.

Figure 10:
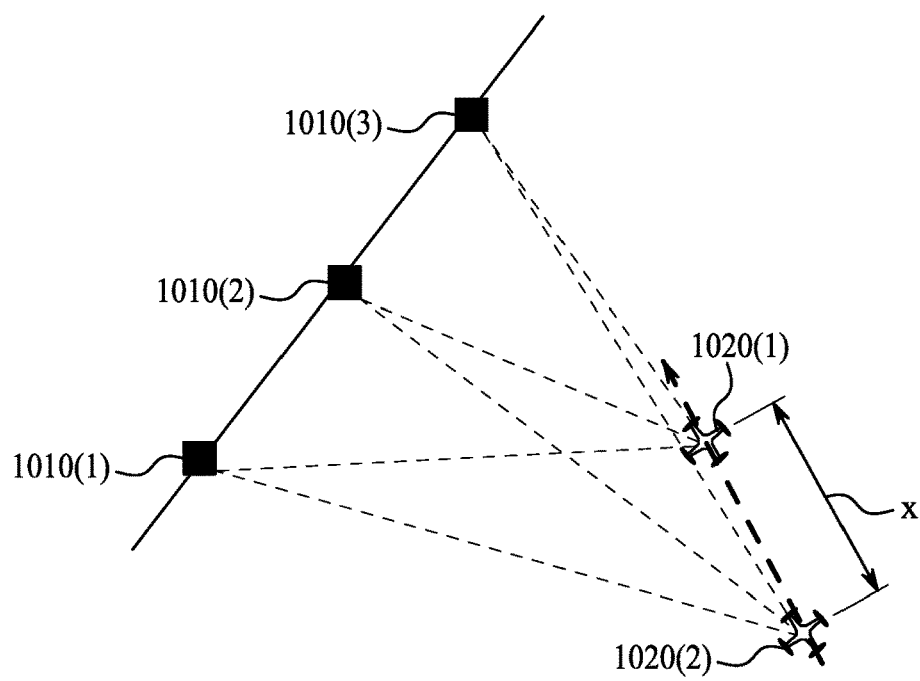
FIG. 10 illustrates determination, by a group of airborne defense agents, of the speed of an attacking agent approaching a protected site, according to certain embodiments.

FIG. 10 illustrates the determination by ADAs 1010(1), 1010(2), and 1010(3) (collectively "the ADAs 1010") of the speed of AA 1020. As shown in the figure, AA 1020 has traversed a distance x on its trajectory at a certain speed. By determining the distance x that AA 1020 has travelled between two detection times, the ADAs 1010 can determine the speed at which AA 1020 is travelling.

The distance x is the distance between two localization points, and is calculated by triangulating the position of AA 1020 at two consecutive instances of time (using the propagation delay ($\tau$) and an angle of arrival ($\omega$) estimated by the ADAs 1010 and a second localization point being triangulated by the ADAs 1010). The first localization point is calculated by the ADAs 1010, as described above and below. The localization points are measured according to a localization frequency ($f_{lo}$), which may equal 1/T, where T is approximately the time interval between a first at time $t_1$ and the second localization point is calculated at time $t_2$, then $T=t_2-t_1$. Thus, as $f_{lo}$ is the inverse of T, a higher localization frequency value reflects the system localizing the approaching AA more often than at a lower localization frequency. Upon configuring the system, T may be chosen and the distance x can be approximated as a straight line. Accordingly, the calculated values of distance x and $f_{lo}$ can be used to determine the speed, s, of AA 1020 by multiplying x by $f_{lo}$ ($s=xf_{lo}$).

In accordance with the present disclosure, a speed profile, including a minimum speed $S_{min}$ and a maximum speed $S_{max}$ for an AA approaching a protected site may be constructed to reflect the change in speed of the approaching AA. Accuracy of the profiling is limited by the segmentation resolution, and the speed profile may be used in estimating possible trajectories of an approaching AA.

An AA approaching a protected site may traverse a fixed trajectory. In accordance with the present disclosure, a speed profile, including a minimum speed ($S_{min}$) and a maximum speed ($S_{max}$) for an AA approaching a protected site may be constructed to reflect the change in speed of the approaching AA as it travels along the trajectory. To generate a speed profile for an approaching AA, the DAAADS may vary the localization frequency of the ADAs included therein. Varying the localization enables the DAAADS to determine a maximum and a minimum speed for the approaching AA between two consecutive localization points over a given time interval, and to predict, from the determination, possible trajectories the approaching AA may follow.

Figure 11:
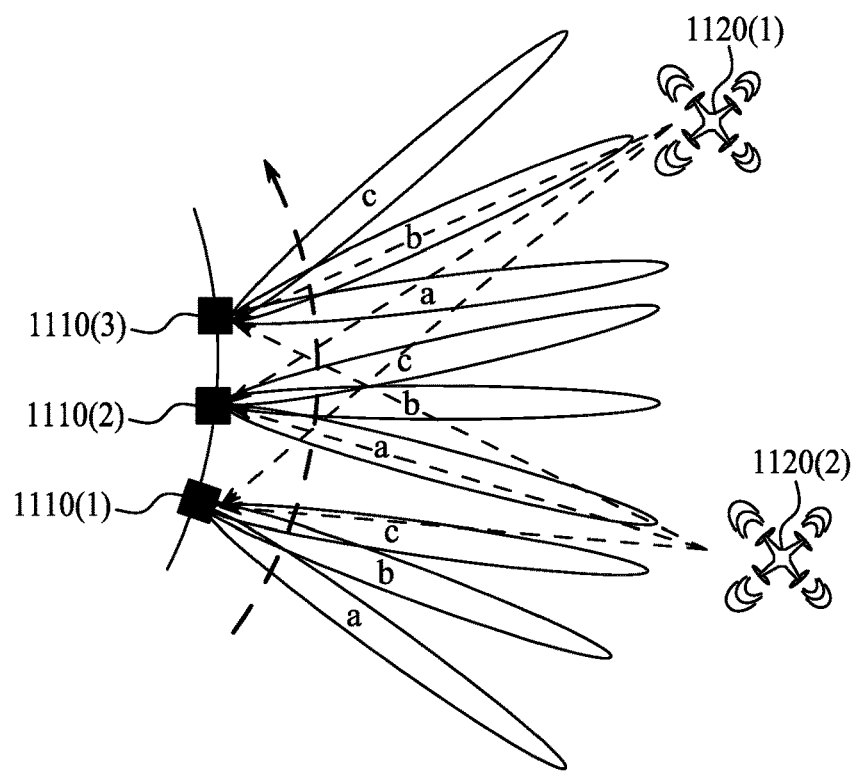
FIG. 11 illustrates an exemplary determination of the number of attacking agents approaching a protected site by airborne defense agents, according to certain embodiments.

FIG. 11 depicts an exemplary determination of numbers of approaching attacking agents may be counted by airborne defense agents. A microphone array included in ADA 1110(1), 1110(2), and 1110(3) (collectively "the ADAs 1110") generate loops. The microphone array of each of the ADAs 1110 generates loop a, loop b, and loop c. To count the number of approaching AAs, one loop per ADA at a time receives the acoustic signal with the highest power ($P_h$) emitted from an AA approaching a protected site. Associating an attacking agent, such as AA 1120(1) and/or 1120(2) (collectively, "the AAs 1120") to a single loop of the loops emitted by the microphone arrays of the ADAs 1110 reduces conflicts arising from potential inaccuracies in propagation delays measured and/or angles of arrival estimated by the ADAs 1110 in counting the number of approaching AAs.

Figure 12:
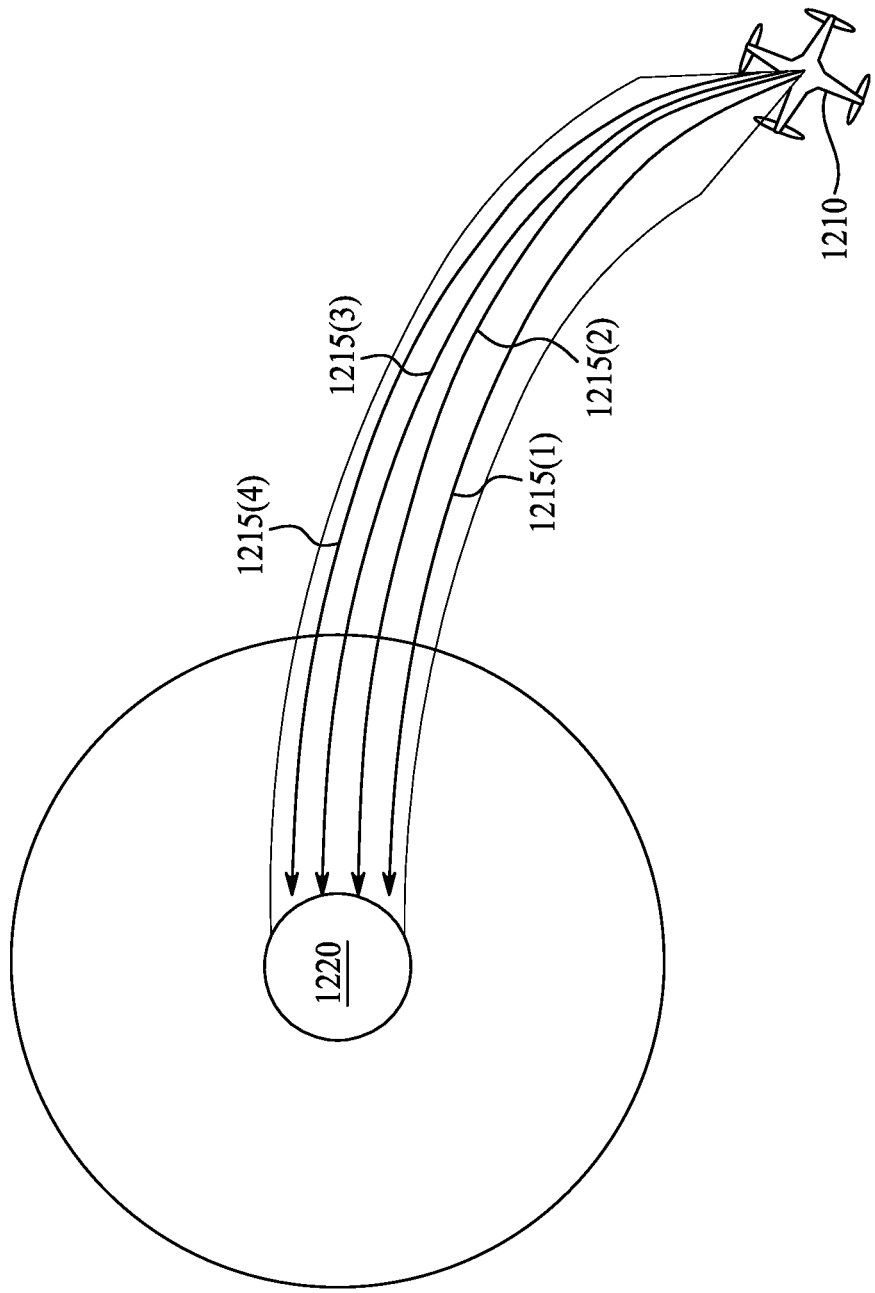
FIG. 12 illustrates examples of multiple trajectories an attacking agent may traverse while approaching a protected site, according to certain embodiments.

FIG. 12 illustrates the multiple possible trajectories 1215(1), 1215(2), 1215(3), and 1215(4) (collectively "the possible trajectories 1215") attacking agent 1210 may take while approaching protected site 1220. The possible trajectories 1215 may be predicted, using machine learning algorithms executing on circuitry included at the BS-CC included in protected site 1210 (e.g., BS-CC 132). To predict the possible trajectories 1215 AA 1210 may traverse while approaching protected site 1220, the artificial intelligence may use the propagation delay of acoustic signals emitted from AA 1210, an angle(s) of arrival of AA 1210, a speed profile(s) of AA 1210, and/or a combination thereof.

FIGS. 13A-13E depict AA multiple processes/groupings the ADAs surrounding a protected site may employ to detect an approaching attacking agent. Each of FIGS. 13A-13E illustrate a portion of protected site 1310 by six ADAs: 1320(1), 1320(2), 1320(3), 1320(3), 1320(4), 1320(5), and 1320(6) (collectively "the ADAs 1320"). Also depicted in each of the FIGS. 13A-13E is AA 1330 following a trajectory 1335 while approaching protected site 1310.

Figure 13C:
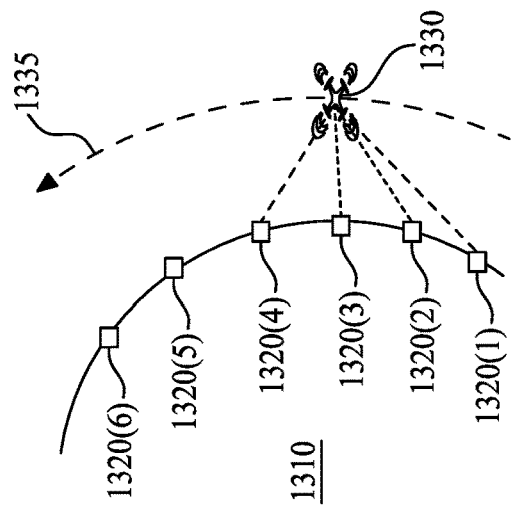
FIGS. 13A-13E illustrate multiple ways in which groups of airborne defense agents may detect an attacking agent approaching a protected site, according to certain embodiments.
Figure 13B:
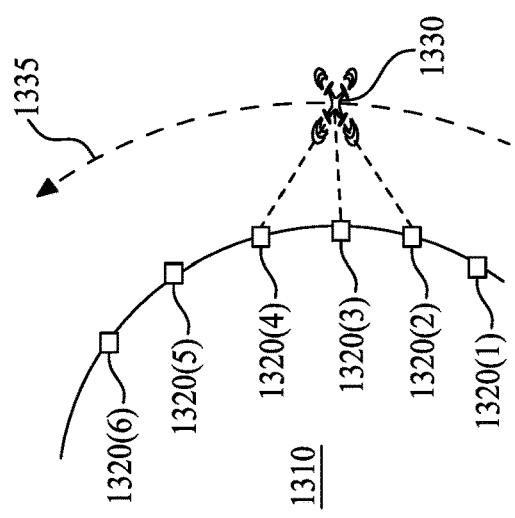
Figure 13A:
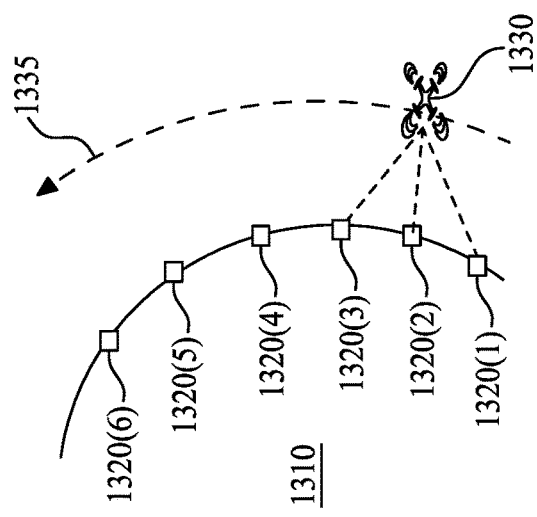

FIGS. 13A and 13B depict AA 1330 being tracked along flight path 1335 by a single group of three of the ADAs 1320 at a time. Initially, as depicted in FIG. 13A, AA 1330 is detected by the group including ADAs 1320(1), 1320(2), and 1320(3). As AA 1330 progresses along flight path 1335, artificial intelligence executing on a BS-CC (not shown, however the BS-CC included in 1310 may be substantially similar/identical to BS-CC 132) transmits a signal to ADA 1320(1) indicating ADA 1320(1) is no longer to detect AA 1330. Simultaneously, the BS-CC transmits a signal to ADA 1320(4) to begin detecting AA 1330 along with ADAs 1320(2) and 1320(3). FIG. 13B depicts AA 1330 being detected by ADAs 1320(2), 1320(3), and 1320(4) after the artificial intelligence executing on the BS-CC included in protected site 1310 indicates a handoff between ADA 1320(1) and 1320(4) is to be made.

Alternatively, as depicted in FIG. 13C, AA 1330 may be detected at the same point along flight path 1335 by two overlapping groups of three ADAs at the same time. The first group of three ADAs detecting AA 1330 in FIG. 13C includes ADAs 1320(1), 1320(2), and 1320(3) while the second group of three ADAs detecting AA 1330 includes 1320(2), 1320(3), and 1320(4). As noted above, if processing overhead permits, the BS-CC can instruct all four ADAs (i.e., 1320(1), 1320(2), 1320(3), and 1320(4)) to detect AA 1330 simultaneously to increase the precision of the measurements in some embodiments.

As AA 1330 continues to progress along flight path 1335, the computing device may determine it is more beneficial to have two distinct groups of three ADAs detecting AA 1330 rather than two overlapping groups of three ADAs. FIG. 13D illustrates two distinct groups of three ADAs detecting AA 1330 traversing flight path 1335. The first distinct group of ADAs detecting AA 1330 includes ADAs 1320(1), 1320(2), and 1320(3), while the second distinct group includes ADAs 1320(4), 1320(5), and 1320(6).

Figure 13E:
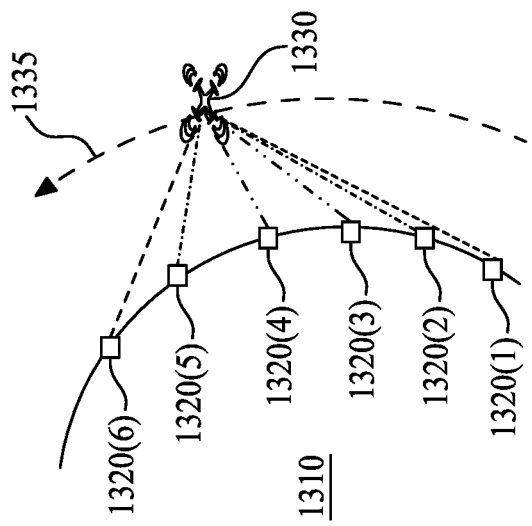
Figure 13D:
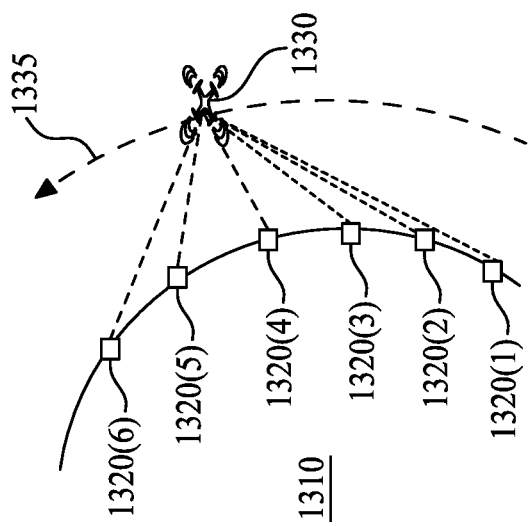

FIG. 13E depicts a scenario in which the computing device determines it is most beneficial for AA 1330 to be detected by as many groups of three ADAs surrounding protected 1310 as possible. As illustrated in FIG. 13E, four groups of three ADAs are detecting AA 1330 along flight path 1335 simultaneously. The four groups of three ADAs detecting AA 1330 include a first group including ADAs 1320(1), 1320(2), and 1320(3); a second group comprising ADAs 1320(2), 1320(3), and 1320(4); a third group including ADAs 1320(3), 1320(4), and 1320(5); and a fourth group including ADAs 1320(4), 1320(5), and 1320(6). The number of groups of three ADAs able to detect AA 1330 simultaneously may depend on the distance of AA 1330 from the ADAs 1320, the strength of acoustic signal(s) emitted from AA 1330, the frequency with which each ADA detects signals (i.e. localization frequency), and/or the sensitivity of the microphone array or other circuitry for sensing acoustic signals included in the AAs 1320. As noted previously, according to certain embodiments all of the ADAs may be used simultaneously to detect any incoming AA, which provides maximum precision in the localization calculations.

A first embodiment of the present disclosure is illustrated as shown in FIGS. 1-13. The first embodiment describes a distributed airborne acoustic anti-drone intelligence system (DAAADS) 100 for detecting trajectories of unmanned aerial vehicles (UAV) (140(1), 140(2), 140(3)) approaching a protected site 120, comprising a plurality of airborne defense agents (ADAs) (110(1)-110(*n*)), wherein each ADA is located at a fixed radius from the protected site and equidistant from each other ADA, wherein each ADA equipped with a directional microphone array 311 configured to detect acoustic signals emitted by a UAV, a first computing device 313 including a first computer-readable medium comprising first program instructions, executable by first processing circuitry, to cause the first processing circuitry to determine a direction and a distance of each approaching UAV 140(1), 140(2), and 140(3) from the ADA 110(1)-110($n$), a GPS receiver 314 configured to locate the ADA 110(1)-110($n$) in three-dimensional space, a transceiver 315, a base station 130 configured with a wideband communications link 134 to communicate with the transceiver 315 of each ADA 110(1)-110($n$) and the protected site 120, a control center (BS-CC) 132 located within the base station 130 and configured with a second computing device 136 including a second computer-readable medium comprising program instructions, executable by second processing circuitry, to cause the second processing circuitry to aggregate the directions and distances of the approaching UAVs 140(1), 140(2), and 140(3) to predict routes towards the protected site 120 and to alert the protected site 120 of the predicted route of each approaching UAV 140(1), 140(2), and 140(3).

Each ADA 110(1)-110($n$) further comprises a motor 318, a propeller 319 and navigation circuitry 316 configured to cause the ADA to hover at a fixed height from the ground, at a fixed radius from the protected site 120 and equidistant from each other ADA 110(1)-110($n$).

The control center (BS-CC) 132 is configured to transmit position signals to the navigation circuitry 316 of each ADA 110(1)-110($n$) to control its speed and position.

DAAADS 100 further comprises a plurality of fixed towers 330 of height H. Each tower 330 is located at a fixed radius from the protected site 120 and equidistant from each other tower 330. DAAADS 100 further includes a plurality of ropes, each rope 320 of length L, wherein a top portion of each fixed tower 330 is connected to one rope 320 of the plurality of ropes. A plurality of air balloons (not shown), each having a lower mount attached to a rope 320, is configured to hold the first computing device 313 and the directional microphone array 311 of an ADA (e.g., ADA 110(1)) at a fixed height of L+H above the ground.

In accordance with the present disclosure, the first computing device 313 comprising DAAADS 100 includes switching circuitry configured to switch the power of each directional microphone of directional microphone array 311 ON and OFF in an alternating sequence. Moreover, the second processing circuitry 136 is configured to transmit control signals to the ADAs 110(1)-110($n$) to switch the directional microphone arrays 311 ON and OFF simultaneously.

The first processing circuitry 313 may also be configured to: convert the acoustic signals from the time domain to the frequency domain, identify a set of frequency components, and estimate the distance to the sound source.

In accordance with the present disclosure, each directional microphone of the directional microphone array 311 is oriented to receive acoustic signals from a different angle. Each first computing device 313 includes circuitry configured to measure an amplitude, A, of each acoustic signal during the alternating ON periods. Further, each first processing circuitry 313 is configurable to detect an angle of arrival, $\omega$, of the acoustic signal from the angle of the directional microphone receiving the greatest amplitude, and to estimate the distance between each ADA and a UAV by measuring a propagation delay, $\tau$, of the acoustic signal having the greatest amplitude.

The second processing circuitry 136 is configurable to predict the route of an approaching UAV (e.g., 140(1)) by triangulating the acoustic signals received by the directional microphone arrays 311 of three equidistant ADAs (e.g., 110(1), 110(2), and 110(3)). The second processing circuitry further comprises a machine learning processor configured to predict the route of each approaching UAV. Second processing circuitry 136 is further configurable to estimate the speed of the approaching UAV 140(1) by subtracting the distances estimated by each of three equidistant ADAs 110(1), 110(2), and 110(3) at a first ON period (e.g., ON[1]) from the distances estimated at a second ON period (e.g., ON[2]) and dividing the difference by the time between the first ON period and the second ON period.

A second embodiment of the present disclosure depicted in FIGS. 1-13 is directed to a method 400 for detecting trajectories of unmanned aerial vehicles (e.g., UAVs 140(1), 140(2), and 140(3)) approaching a protected site 120 by a plurality of airborne defense agents (ADAs 110(1)-110($n$)). The method includes, at step 410, switching each directional microphone of a directional microphone array 311 of an ADA ON and OFF during consecutive time periods in which only one directional microphone is ON in a time period. The method 400 further includes, at step 420, detecting acoustic signals generated by UAVs 140(1), 140(2), and 140(3) approaching the protected site 120 during consecutive ON periods. Method 400 further comprises estimating, at step 430, by a first processing circuitry 313 of an ADA (e.g., 110(1)), an angle of approach and a distance of each approaching UAV 140(1), 140(2), and 140(3) from each ADA 110(1)-110($n$) during the first time period. At step 440, method 400 comprises estimating an angle of approach and distance of each approaching UAV 140(1), 140(2), and 140(3) from each ADA 110(1)-110($n$) during the second time period. The next step in method 400 includes transmitting the estimated angle of approach and distance from each ADA 110(1)-110($n$) to a base station 130 at step 450. At step 460, a second processing circuitry 136 of the base station 130 estimates a speed of each UAV 140(1), 140(2), and 140(3) by subtracting the distance estimated during a first ON time period from the distance measured during a second ON time period for each of three equidistant ADAs (e.g., 110(1), 110(2), and 110(3)) and dividing by the difference between the first and second time periods. Method 400 further includes, at step 470, aggregating the angles of approach, distances and speeds of the approaching UAVs 140(1), 140(2), and 140(3) to predict routes towards the protected site 120. Method 400 concludes at step 480 by transmitting an alert to the protected site 120 when the route of at least one approaching UAV (e.g., 140(1), 140(2), or 140(3)) intersects with the protected site 120.

Optionally, at step 405, navigation signals are transmitted to each ADA 110(1)-110($n$), wherein the navigation signals control the ADA 110(1)-110($n$) to hover at a fixed height from the ground, at a fixed radius from the protected site 120, and equidistant from each other ADA of the ADAs 110(1)-110($n$). Also optionally, at step 408, the base station 130 may transmit control signals to each ADA 110(1)-110($n$) to switch each directional microphone array 311 ON to start detecting acoustic signals or OFF to sleep based on a number of approaching UAVs.

In accordance with the present disclosure, the first processing circuitry 313 of each ADA 110(1)-110($n$) converts the acoustic signals from the time domain into the frequency domain, identify a set of frequency components, and estimate the distance to the approaching UAV 140(1), 140(2), and/or 140(3).

According to some aspects, each directional microphone of the directional microphone array (e.g., directional microphone array 311) may be oriented to receive acoustic signals from a different angle. The first processing circuitry 313 measures an amplitude, A, of each acoustic signal during the alternating ON periods. An angle of arrival, ω, of the acoustic signal is detected from the angle of the directional microphone receiving the greatest amplitude. The distance between each ADA 110(1)-110(n) and a UAV 140(1), 140 (2), and/or 140(3) is estimated by measuring a propagation delay, τ, of the acoustic signal having the greatest amplitude.

The second processing circuitry 136 predicts the route of an approaching UAV 140(1), 140(2), and/or 140(3) by triangulating the acoustic signals received by the directional microphone arrays of three equidistant ADAs (e.g., 110(1), 110(2), and 110(3)). The second processing circuitry 136 also applies the aggregated angles of approach, distances, and speeds of the approaching UAVs 140(1), 140(2), and 140(3) to a machine learning processor to predict the routes of the approaching UAVs 140(1), 140(2), and 140(3).

A third embodiment of the present disclosure depicted in FIGS. 1-13 is directed to a non-transitory computer readable medium having instructions stored therein that, when executed by one or more processors, cause the one or more processors to perform a method for detecting trajectories of unmanned aerial vehicles (UAVs 140(1), 140(2), and 140 (3)) approaching a protected site 120 by a plurality of airborne defense agents (ADAs 110(1)-110(n)). The method executed comprises switching each directional microphone of a directional microphone array 311 of an ADA (e.g., ADA 110(1)) ON and OFF during consecutive time periods in which only one directional microphone is ON in a time period. The method also includes detecting acoustic signals generated by UAVs 140(1), 140(2), and 140(3) approaching the protected site 120 during consecutive ON periods; estimating, by a first processing circuitry 313 of an ADA 110(1), an angle of approach and a distance of each approaching UAV 140(1), 140(2), and 140(3) from each ADA 110(1)-110(n) during the first time period; and estimating an angle of approach and distance of each approaching UAV 140(1), 140(2), and 140(3) from each ADA 110 (1)-110(n) during the second time period.

The method executed by the non-transitory computer readable medium includes transmitting the estimated angle of approach and distance from each ADA 110(1)-110(n) to a base station 130; estimating, by a second processing circuitry 136 of the base station 130, a speed of each UAV 140(1), 140(2), and 140(3) by subtracting the distance estimated during a first ON time period (e.g., ON[1]) from the distance measured during a second ON time period (e.g., ON[2]) for each of three equidistant ADAs (e.g., ADAs 110(1), 110(2), and 110(3) and dividing by the difference between the first and second time periods; aggregating the angles of approach, distances and speeds of the approaching UAVs 140(1), 140(2), and 140(3) to predict routes towards the protected site 120; and transmitting an alert to the protected site 120 when the route of at least one of the approaching UAVs 140(1), 140(2) and 140(3) intersects with the protected site 120.

The non-transitory computer readable medium may further orient each directional microphone of the directional microphone array 311 of an ADA of the ADAs 110(1)-110 (n) to receive acoustic signals from a different angle. The first processing circuitry 313 may also measure an amplitude, A, of each acoustic signal during the alternating ON periods; detect an angle of arrival, ω, of the acoustic signal from the angle of the directional microphone receiving the greatest amplitude; and estimate the distance between each ADA 110(1)-110(n) and a UAV 140(1), 140(2), and/or 140(3) by measuring a propagation delay, τ, of the acoustic signal having the greatest amplitude.

Moreover, the non-transitory computer readable medium method is able to predict, by the second processing circuitry 136, the route of each approaching UAV by triangulating the acoustic signals received by the directional microphone arrays of three equidistant ADAs. The second processing circuitry 136 also applies the aggregated angles of approach, distances, speeds, and predicted routes of the approaching UAVs 140(1), 140(2), and 140(3) to a machine learning processor to predict the routes which intersect with the protected site 120.

Figure 14:
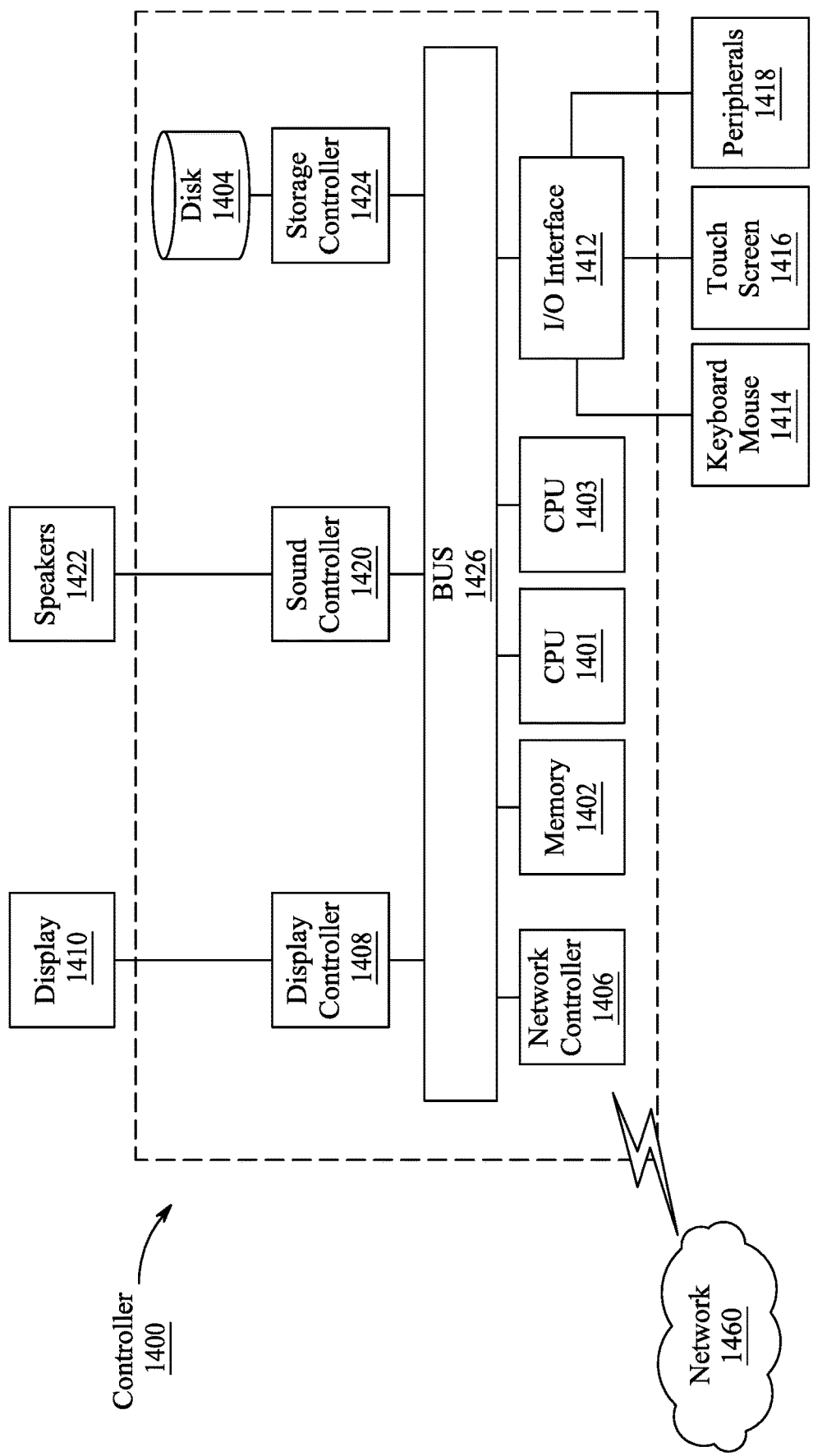
FIG. 14 is an illustration of a non-limiting example of details of computing hardware used in the computing system, according to certain embodiments.

Next, further details of the hardware description of the computing environment of base station 130 according to exemplary embodiments is described with reference to FIG. 14. In FIG. 14, a controller 1400 is described is representative of the computer 136 of FIG. 1 in which the controller is a computing device which includes a CPU 1401 which performs the processes described above/below. The process data and instructions may be stored in memory 1402. These processes and instructions may also be stored on a storage medium disk 1404 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1401, 1403 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1401 or CPU 1403 may be a Xenon or Core processor from Intel of America or an Opteron processor from AMD of America, or may be other processor types that would be recognized by one of ordinary skill in the art. Alternatively, the CPU 1401, 1403 may be implemented on an FPGA, ASIC, PLD or using discrete logic circuits, as one of ordinary skill in the art would recognize. Further, CPU 1401, 1403 may be implemented as multiple processors cooperatively working in parallel to perform the instructions of the inventive processes described above.

The computing device in FIG. 14 also includes a network controller 1406, such as an Intel Ethernet PRO network interface card from Intel Corporation of America, for interfacing with network 1460. As can be appreciated, the network 1460 can be a public network, such as the Internet, or a private network such as an LAN or WAN network, or any combination thereof and can also include PSTN or ISDN sub-networks. The network 1460 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1408, such as a NVIDIA GeForce GTX or Quadro graphics adaptor from NVIDIA Corporation of America for interfacing with display 1410, such as a Hewlett Packard HPL2445w LCD monitor. A general purpose I/O interface 1412 interfaces with a keyboard and/or mouse 1414 as well as a touch screen panel 1416 on or separate from display 1410. General purpose I/O interface also connects to a variety of peripherals 1418 including printers and scanners, such as an OfficeJet or DeskJet from Hewlett Packard.

A sound controller 1420 is also provided in the computing device such as Sound Blaster X-Fi Titanium from Creative, to interface with speakers/microphone 1422 thereby providing sounds and/or music.

The general purpose storage controller 1424 connects the storage medium disk 1404 with communication bus 1426, which may be an ISA, EISA, VESA, PCI, or similar, for interconnecting all of the components of the computing device. A description of the general features and functionality of the display 1410, keyboard and/or mouse 1414, as well as the display controller 1408, storage controller 1424, network controller 1406, sound controller 1420, and general purpose I/O interface 1412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 15.

Figure 15:
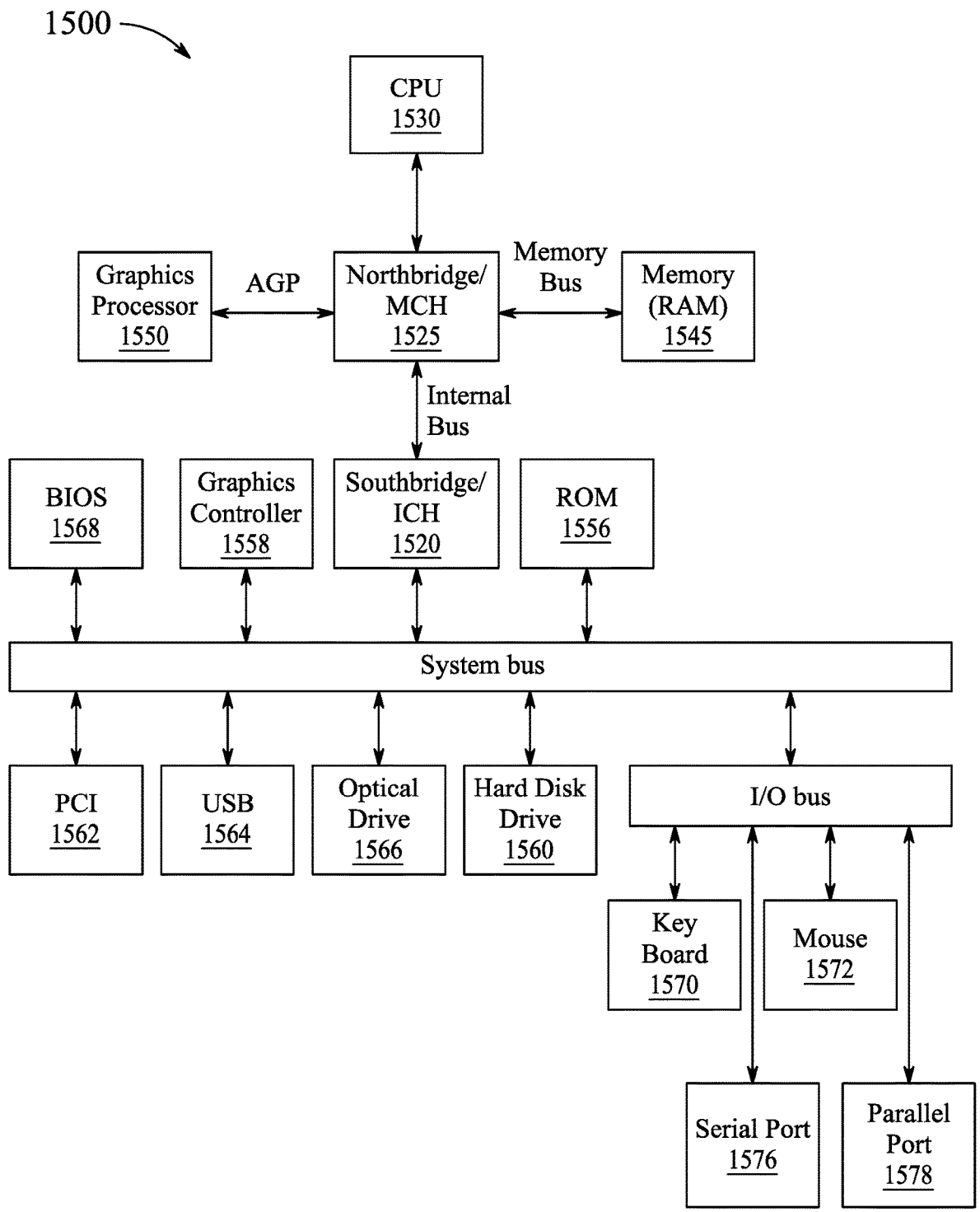
FIG. 15 is an exemplary schematic diagram of a data processing system used within the computing system, according to certain embodiments.

FIG. 15 shows a schematic diagram of a data processing system, according to certain embodiments, for performing the functions of the exemplary embodiments. The data processing system is an example of a computer in which code or instructions implementing the processes of the illustrative embodiments may be located.

In FIG. 15, data processing system 1500 employs a hub architecture including a north bridge and memory controller hub (NB/MCH) 1525 and a south bridge and input/output (I/O) controller hub (SB/ICH) 1520. The central processing unit (CPU) 1530 is connected to NB/MCH 1525. The NB/MCH 1525 also connects to the memory 1545 via a memory bus, and connects to the graphics processor 1550 via an accelerated graphics port (AGP). The NB/MCH 1525 also connects to the SB/ICH 1520 via an internal bus (e.g., a unified media interface or a direct media interface). The CPU Processing unit 1530 may contain one or more processors and even may be implemented using one or more heterogeneous processor systems.

Figure 16:
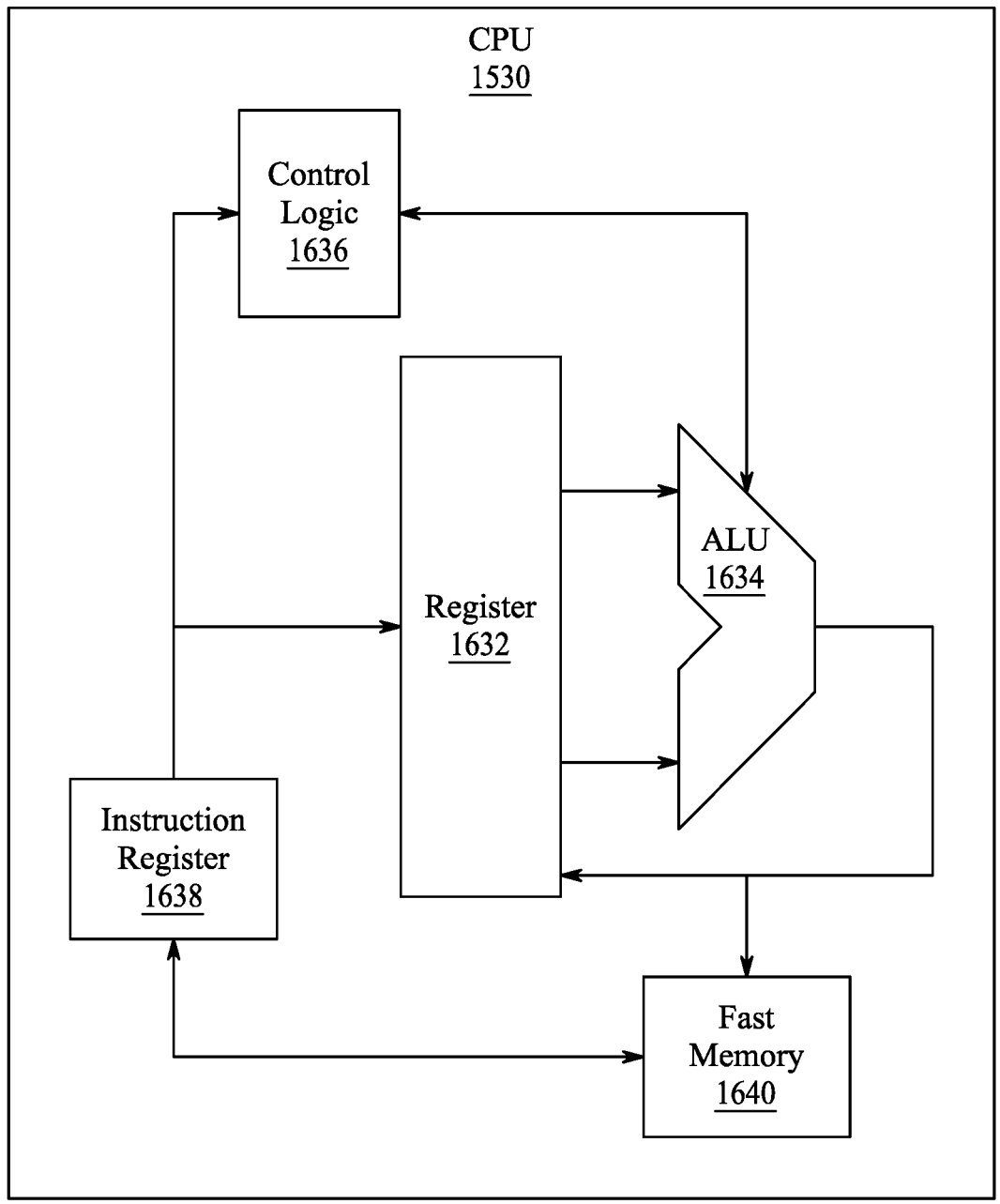
FIG. 16 is an exemplary schematic diagram of a processor used with the computing system, according to certain embodiments.

For example, FIG. 16 shows one implementation of CPU 1530. In one implementation, the instruction register 1638 retrieves instructions from the fast memory 1640. At least part of these instructions are fetched from the instruction register 1638 by the control logic 1636 and interpreted according to the instruction set architecture of the CPU 1530. Part of the instructions can also be directed to the register 1632. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1634 that loads values from the register 1632 and performs logical and mathematical operations on the loaded values according to the instructions. The results from these operations can be feedback into the register and/or stored in the fast memory 1640. According to certain implementations, the instruction set architecture of the CPU 1530 can use a reduced instruction set architecture, a complex instruction set architecture, a vector processor architecture, a very large instruction word architecture. Furthermore, the CPU 1530 can be based on the Von Neuman model or the Harvard model. The CPU 1530 can be a digital signal processor, an FPGA, an ASIC, a PLA, a PLD, or a CPLD. Further, the CPU 1530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 15, the data processing system 1500 can include that the SB/ICH 1520 is coupled through a system bus to an I/O Bus, a read only memory (ROM) 1556, universal serial bus (USB) port 1564, a flash binary input/output system (BIOS) 1568, and a graphics controller 1558. PCI/PCIe devices can also be coupled to SB/ICH 1588 through a PCI bus 1562.

The PCI devices may include, for example, Ethernet adapters, add-in cards, and PC cards for notebook computers. The Hard disk drive 1560 and CD-ROM 1566 can use, for example, an integrated drive electronics (IDE) or serial advanced technology attachment (SATA) interface. In one implementation the I/O bus can include a super I/O (SIO) device.

Further, the hard disk drive (HDD) 1560 and optical drive 1566 can also be coupled to the SB/ICH 1520 through a system bus. In one implementation, a keyboard 1570, a mouse 1572, a parallel port 1578, and a serial port 1576 can be connected to the system bus through the I/O bus. Other peripherals and devices that can be connected to the SB/ICH 1520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 17:
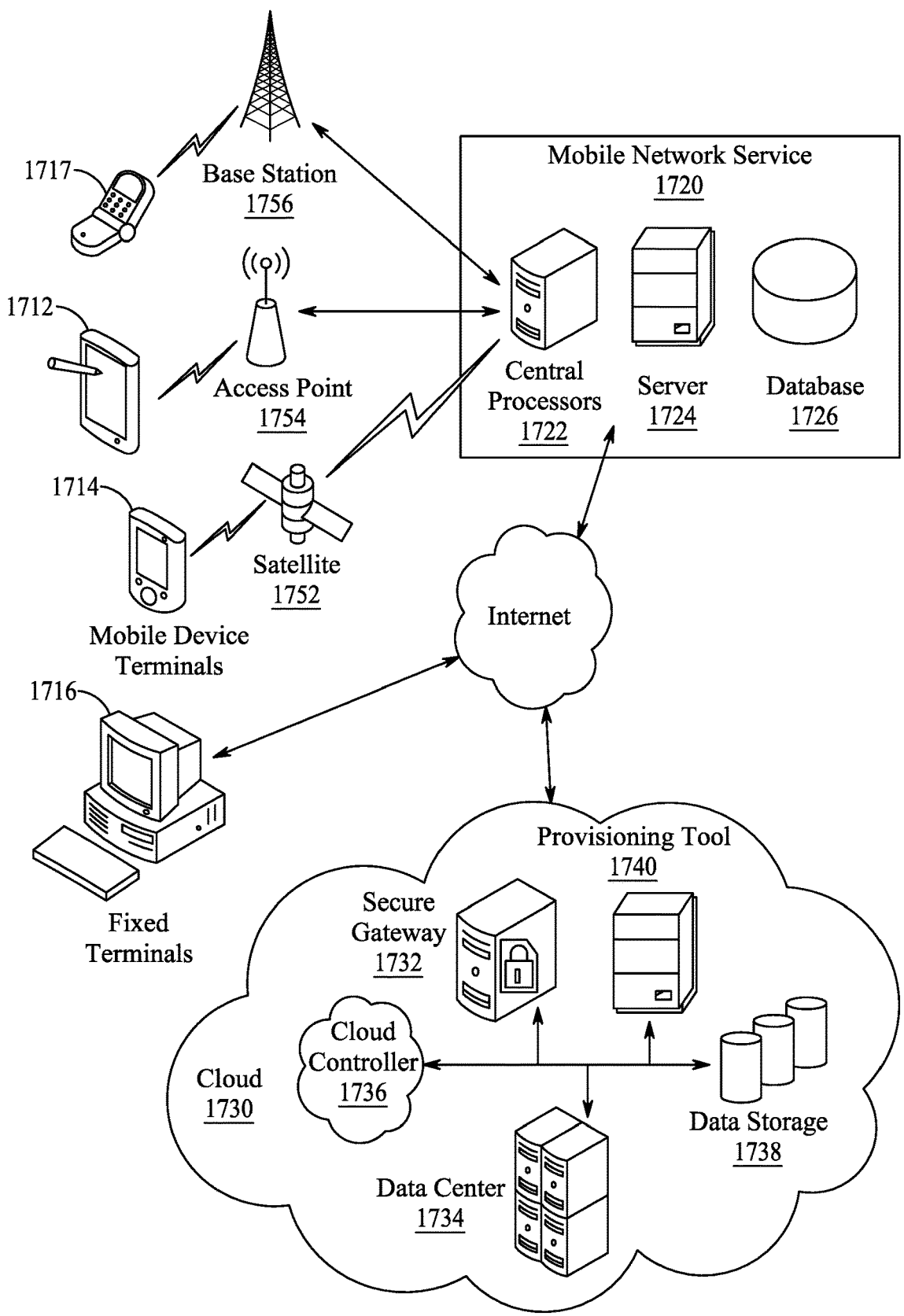
FIG. 17 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 17, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A distributed airborne acoustic anti-drone intelligence system (DAAADS) for
    detecting trajectories of unmanned aerial vehicles (UAV) approaching a protected site, comprising:
    a plurality of airborne defense agents (ADAs),
        wherein each ADA is located at a fixed radius from the protected site and
        equidistant from each other ADA,
        wherein each ADA equipped with:
        a directional microphone array configured to
        detect acoustic signals emitted by a UAV;
        a first computing device including
        a first computer-readable medium comprising first program instructions,
        executable by first processing circuitry,
        to cause the first processing circuitry to
        determine a direction and
        a distance of each approaching UAV from the ADA;
        a GPS receiver configured to locate the ADA in three-dimensional space;
        a transceiver;
    a base station configured with a wideband communications link to communicate
        with the transceiver of each ADA and the protected site;
    a control center (BS-CC) located within the base station and configured with
        a second computing device including
        a second computer-readable medium comprising program instructions,
        executable by second processing circuitry, to
        cause the second processing circuitry to aggregate the directions and distances of the approaching UAVs to
        predict routes towards the protected site and to
        alert the protected site of the predicted route of each approaching UAV,
    a plurality of fixed towers of height H,
        each tower located at a fixed radius from the protected site and
equidistant from each other tower;
    a plurality of ropes,
        each rope of length L,
        wherein a top portion of each fixed tower is
connected to one of the plurality of ropes;
    a plurality of air balloons,
        each air balloon having a lower mount attached to the rope; and
        wherein each air balloon is configured to
        hold the first computing device and
        the directional microphone array of
        the ADA at a fixed height L+H above the ground.

2. The system of claim 1, each ADA further comprising:
    a motor, a propeller and navigation circuitry configured to cause the ADA to hover at a fixed height from the ground, at a fixed radius from the protected site and equidistant from each other ADA.

3. The system of claim 2, wherein the control center is configured to transmit position signals to the navigation circuitry of each ADA to control its speed and position.

4. The system of claim 1, further comprising:
    wherein the first computing device includes switching circuitry configured to switch the power of each directional microphone ON and OFF in an alternating sequence; and
    wherein the second processing circuitry is configured to transmit control signals to the ADAs to switch the directional microphone arrays ON and OFF simultaneously.

5. The system of claim 4, further comprising:
    wherein the first processing circuitry is configured to convert the acoustic signals from the time domain to the frequency domain, identify a set of frequency components and estimate the distance to the sound source.

6. The system of claim 5, further comprising:
    wherein each directional microphone of the directional microphone array is oriented to receive acoustic signals from a different angle;
    wherein each first computing device includes circuitry configured to measure an amplitude, A, of each acoustic signal during the alternating ON periods;
    wherein each first processing circuitry is configured to:
    detect an angle of arrival, co, of the acoustic signal from the angle of the directional microphone receiving the greatest amplitude; and
    estimate the distance between each ADA and a UAV by measuring a propagation delay, τ, of the acoustic signal having the greatest amplitude.

7. The system of claim 6, further comprising:
    wherein the second processing circuitry is further configured to predict the route of an approaching UAV by triangulating the acoustic signals received by the directional microphone arrays of three equidistant ADAs.

8. The system of claim 7, the second processing circuitry further comprising a machine learning processor configured to predict the route of each approaching UAV.

9. The system of claim 8, further comprising:
    wherein the second processing circuitry is further configured to estimate the speed of the approaching UAV by subtracting the distances estimated by each of three equidistant ADAs at a first ON period from the distances estimated at a second ON period and dividing the difference by the time between the first ON period and the second ON period.

10. A non-transitory computer readable medium having instructions stored therein that, when executed by one or more processors, cause the one or more processors to perform a method for detecting trajectories of unmanned aerial vehicles (UAV) approaching a protected site by a plurality of airborne defense agents (ADAs), comprising:
    switching each directional microphone of a directional microphone array of an ADA ON and OFF during consecutive time periods in which only one directional microphone is ON in a time period;
    orienting each directional microphone of the directional microphone array of an ADA to receive acoustic signals from a different angle;
    detecting acoustic signals generated by UAVs approaching the protected site during consecutive ON periods;
    measuring, by the first processing circuitry, an amplitude, A, of each acoustic signal during the consecutive ON periods;
    detecting an angle of arrival, ω, of the acoustic signal from the angle of the directional microphone receiving the greatest amplitude; and
    estimating the distance between each ADA and a UAV by measuring a propagation delay, τ, of the acoustic signal having the greatest amplitude,
    estimating, by a first processing circuitry of an ADA, an angle of approach and a distance of each approaching UAV from each ADA during the first time period;

estimating an angle of approach and distance of each approaching UAV from each ADA during the second time period;

transmitting the estimated angle of approach and distance from each ADA to a base station;

estimating, by a second processing circuitry of the base station, a speed of each UAV by subtracting the distance estimated during a first ON time period from the distance measured during a second ON time period for each of three equidistant ADAs and dividing by the difference between the first and second time periods;

aggregating the angles of approach, distances and speeds of the approaching UAVs to predict routes towards the protected site; and transmitting an alert to the protected site when the route of at least one approaching UAV intersects with the protected site.

11. The non-transitory computer readable medium method of claim 10, further comprising:

predicting, by the second processing circuitry, the route of each approaching UAV by triangulating the acoustic signals received by the directional microphone arrays of three equidistant ADAs; and applying, by the second processing circuitry, the aggregated angles of approach, distances, speeds and predicted routes of the approaching UAVs to a machine learning processor to predict the routes which intersect with the protected site.

\* \* \* \* \*